United States Patent
Naganuma

Patent Number: 5,959,666
Date of Patent: Sep. 28, 1999

[54] HAND DEVIATION CORRECTION APPARATUS AND VIDEO CAMERA

[75] Inventor: Kazuto Naganuma, Tokyo, Japan

[73] Assignee: Sony Corporation, Tokyo, Japan

[21] Appl. No.: 08/652,337

[22] Filed: May 22, 1996

[30] Foreign Application Priority Data

May 30, 1995 [JP] Japan ..................... 7-132354
May 30, 1995 [JP] Japan ..................... 7-132356

[51] Int. Cl.$^6$ ............................................. H04N 5/228
[52] U.S. Cl. ............................................... 348/208
[58] Field of Search ............................. 348/208, 211

[56] References Cited

U.S. PATENT DOCUMENTS

| | | | |
|---|---|---|---|
| 5,282,044 | 1/1994 | Misawa et al. | 358/222 |
| 5,453,800 | 9/1995 | Kondo et al. | 348/699 |
| 5,502,484 | 3/1996 | Okada | 348/208 |

Primary Examiner—Wendy Garber
Assistant Examiner—Jacqueline Wilson
Attorney, Agent, or Firm—Frommer Lawrence & Haug, LLP.; William S. Frommer; Dennis M. Smid

[57] ABSTRACT

A hand deviation correction device for correcting hand deviation components of an image. The hand deviation correction device includes a deflection detection unit for detecting the state of deflection, a deflection state discriminating unit for discriminating at least willful deflection and deflection by hand deviation, as deflection state, based on deflection detection signals from the deflection detection unit and a deflection correction signal outputting unit for calculating a deflection correction amount from the deflection state discrimination unit based on the deflection state discriminating signal from the deflection state discriminating unit for outputting a deflection correction signal. By discriminating the state of willful deflection, such as that caused by panning or tilting, from non-wilful deflection caused by hand deviation, the amount of correction corresponding to the state of deflection, that is, the zero correction mount for panning or tilting and a calculated value of the correction amount for deflection caused by hand deviation, may be used.

12 Claims, 24 Drawing Sheets

HAND DEVIATION CORRECTION APPARATUS AND VIDEO CAMERA

BACKGROUND OF THE INVENTION

1. Field of the Invention

This invention relates to a hand deviation correction device for correcting hand deviation components of an image, and to a video camera.

2. Description of the Related Art

Recently, a handy type video camera having a charge coupled device (CCD) type image sensor is in widespread use.

Such video camera has a drawback that, since it is hand-held during imaging, hand deviation is liable to be incurred during imaging. If such hand deviation is incurred during imaging, deterioration in the image quality is incurred on reproduction of an image shot with, for example, a zoom-up, thus making the reproduced image extremely ill-looking.

Consequently, such a video camera has recently been marketed on which is loaded a hand deviation correction device for correcting hand deviation caused during imaging.

On the other hand, the techniques such as panning, that is moving the camera in a transverse direction during imaging, or tilting, that is moving the camera from above towards below or vice versa during imaging, are frequently employed in imaging with the video camera.

Referring to FIGS. 1 and 2, a conventional structure of a hand deviation correction device loaded on a video camera is explained. While there are a variety of hand deviation correction systems, one of such systems employing a so-called memory control system is now explained. On detection of hand deviation with the memory control system, part of picture signals imaged by the CCD image sensor of the video camera is taken out as an image frame, an image frame of the previous field and an image frame of the current field are moved into registration with each other depending on the amount of hand deviation for correction of the hand deviation. As a system for detecting the amount of hand deviation, an angular velocity detection system is employed. The angular velocity detection system is such a system in which the angular velocity caused by hand deviation is detected, using an angular velocity sensor formed as a piezo-electric oscillation gyro, and the amount of hand deviation is found based on the detected angular velocity.

Referring to FIG. 1, angular velocity data from an angular velocity sensor is supplied to a terminal 120 and thence to a high-pass filter 121. The high-pass filter 121 is such a filter mainly removing low-frequency components caused by panning or tilting of the video camera from the angular velocity data while directly passing hand-deviation components.

Output data from the high-pass filter 121 is multiplied by a multiplier 127 with a pre-set multiplication coefficient from a total gain adjustment unit 128 so as to be then multiplied with a multiplication coefficient corresponding to a zooming multiplication factor in optical zooming by a multiplier 129 before being sent to a low-pass filter 154. The total gain adjustment unit 128 is provided for producing a multiplication coefficient for correcting fluctuations in the gain of the correction signal from an optical system and an angular velocity sensor of the video camera and which is not necessarily a design mid value. In a zoom gain table 130 are stored plural multiplication coefficients for gain correction associated with zooming multiplication factors for optical zooming of the video camera. The multiplication coefficients corresponding to the current zooming multiplication factors are read out from the zoom gain table 130 so as to be sent to the multiplier 129. Output data of the multiplier 129 is sent to a low-pass filter 154.

The low-pass filter 154 integrates data supplied from the multiplier 129 of the previous stage using an integration coefficient from an integration coefficient table 136.

The integration coefficients stored in the integration coefficient table 136 is related with an integration output of the low-pass filter 154 in a manner as shown for example in FIG. 2. An integration coefficient corresponding to the integrated value by the LPF 154 (LPF integrated value) is taken out from the integration coefficient table 136 and employed in the low-pass filter 154 for integrating data supplied from the multiplier 129. In FIG. 2, the integration coefficients and the LPF integrated values are plotted on the ordinate and abscissa, respectively. Of the LPF integration values of FIG. 2, an integrated value SH corresponds to one-half of the number of pixels in an excess area in the horizontal direction of the CCD image sensor, while an integrated value SV corresponds to one-half the number of pixels in an excess area in the horizontal direction of the CCD image sensor. That is, with the conventional hand deviation correction device, shown in FIG. 2, the correction for hand deviation and convergence during panning or tilting are performed using common integration coefficients.

Output data of the low-pass filter 154 is outputted at a terminal 145 as hand-deviation correction signals. The video camera performs hand deviation correction for correcting deviation components of an image based on the hand deviation correction signals.

However, if common integration coefficients are used for correcting the hand deviation and for convergence for panning or tilting, a correction region for hand deviation cannot be set to a larger value, while follow-up characteristics for panning to tilting are also not optimum. While the linear correction range can be increased for increasing the correction range of amplitude for hand deviation, the amount of residual hand deviation is increased as a secondary effect. Conversely, for improving the follow-up characteristics for panning or tilting, the range for linear correction needs to be diminished, in which case the correction performance is lowered as a secondary effect.

In addition, in the hand deviation correction device employing the conventional memory control system, as shown in FIG. 2, if excess pixels of the CCD image sensor are ±40 and ±60 in the vertical and horizontal directions, respectively, the number of pixels that can be used in the linear correction region is as small as only ±10 pixels, as shown in FIG. 2.

SUMMARY OF THE INVENTION

It is therefore an object of the present invention to provide a hand deviation correction apparatus and a video camera which can effectively correct for hand deviation and effectively exploit excess pixels of the CCD image sensor and which has good follow-up characteristics with respect to deflection caused by panning or tilting.

In one aspect, the present invention provides a hand deviation device including deflection detection means for detecting the state of deflection, deflection state discriminating means for discriminating at least willful deflection and deflection by hand deviation, as deflection state, based on deflection detection signals from the deflection detection means, and deflection correction signal outputting means for calculating a deflection correction amount from the deflection state discrimination means based on the deflection state discriminating signal from the deflection state discriminating means for outputting a deflection correction signal.

In another aspect, the present invention provides a video camera including imaging means for generating electrical signals corresponding to light incident on an imaging surface thereof, an optical system for forming an incident light image on the imaging surface of the imaging means, image signal generating means for generating image signals from the electrical signals of the imaging means, deflection detection means for detecting the state of deflection, deflection state discrimination means for discriminating at least a willful deflection and deflection caused by hand deviation, as the state of deflection, based on the deflection detection signal from the deflection detection means, deflection correction signal outputting means for calculating the amount of correction of deflection from the deflection detection signal, based on the deflection state discrimination signal from the deflection state discrimination means, and correction means for correcting for deflection responsive to the deflection correction signal.

According to the present invention, the deflection state discrimination means discriminates the state of deflection, while the deflection correction means calculates the amount of correction of deflection responsive to the state of deflection. Therefore, by discriminating the state of willful deflection, such as that caused by panning or tilting, from non-wilful deflection caused by hand deviation, the amount of correction corresponding to the state of deflection, that is, the zero correction amount for panning or tilting and a calculated value of the correction amount for deflection caused by hand deviation, can be employed. Therefore, effective hand-deviation correction may be achieved, while follow-up characteristics with respect to deflections caused by tilting or panning may be improved. In addition, excess pixels of the CCD image sensor may be exploited more effectively. Although hand deviation indicating means are provided in the embodiments, there is no necessity of providing an on/off button for hand deviation correction of the conventional video camera since the correction operation for camera operation is performed each time the camera is used for image shooting.

DESCRIPTION OF THE PREFERRED EMBODIMENTS

Figure 1:
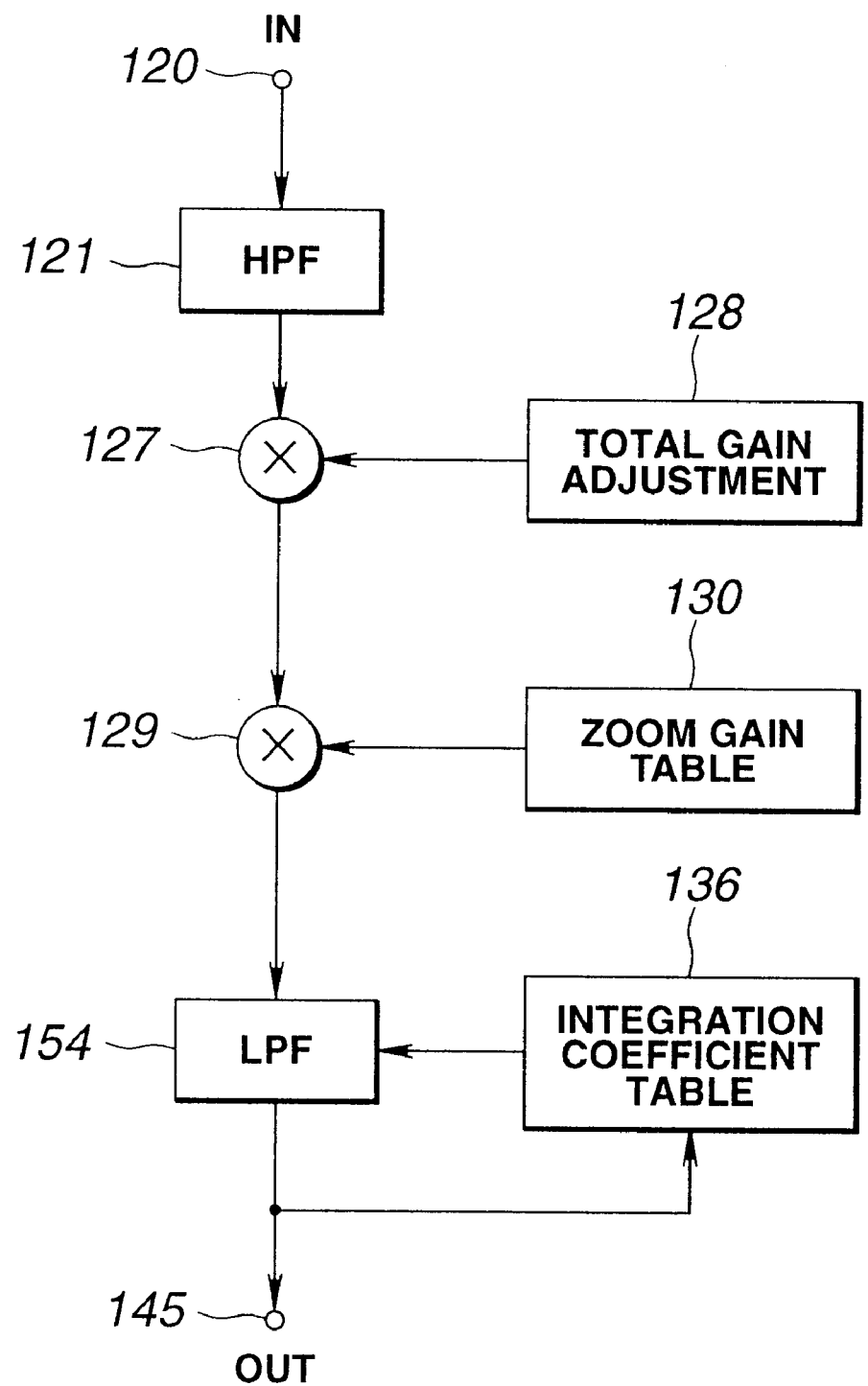
FIG. 1 is a schematic block circuit diagram showing a conventional arrangement for generating hand deviation correction signals.
Figure 2:
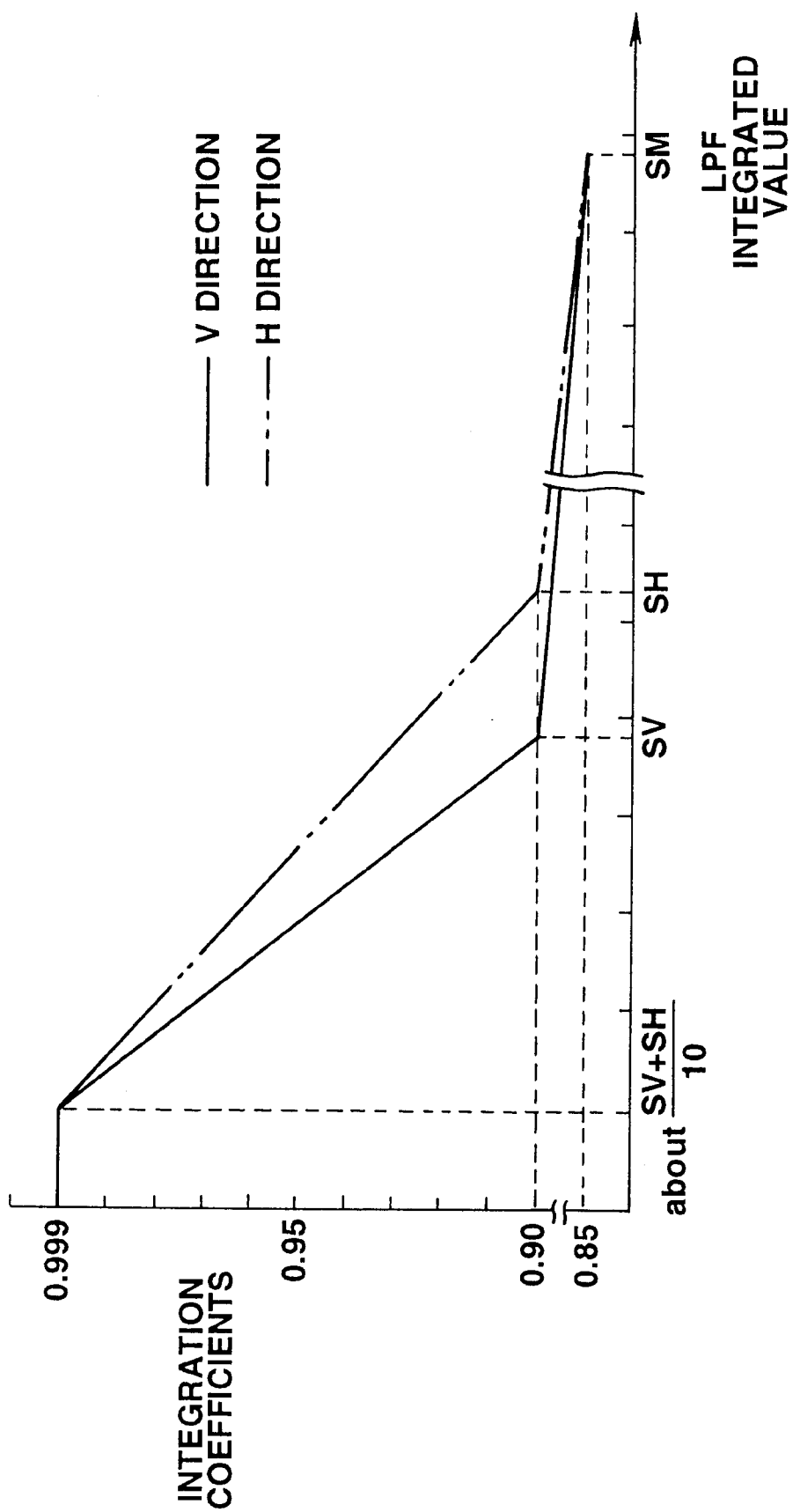
FIG. 2 is a graph for illustrating common integration coefficients for performing conventional correction for hand deviation and for conventional convergence.

Referring to the drawings, preferred embodiments of the present invention will be explained in detail.

A hand deviation correction device of the instant embodiment is loaded on a video camera. While there are a variety of hand deviation correction systems, one of such systems employing a so-called memory control system is explained. The CCD image sensor employed in the instant embodiment is larger by ±48 pixels and by ±63 pixels than the above-mentioned image frame in the vertical direction and in the horizontal direction, respectively. Thus the maximum correction amount of hand deviation is ±48 pixels and ±63 pixels in the vertical and horizontal directions, respectively. The system employed in the instant embodiment for detecting the amount of hand deviation is the angular velocity detection system.

Figure 3:
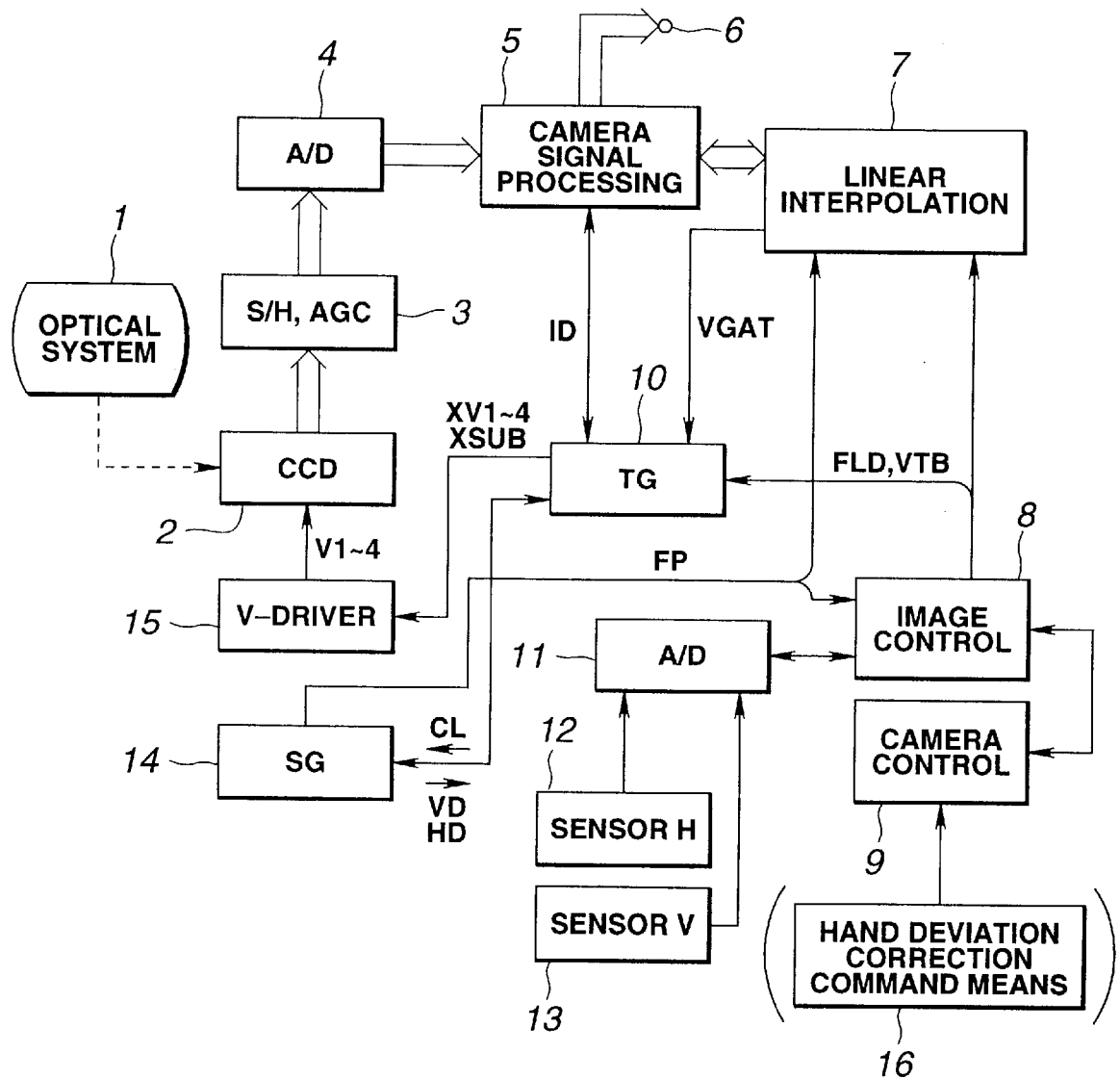
FIG. 3 is a schematic block circuit diagram showing a video camera with a built-in hand deviation correction device embodying the present invention.

Referring to FIG. 3, an arrangement of a video camera carrying the hand deviation correction device of the instant embodiment is now explained.

In this figure, the light from an object is incident via an optical system 1 to a CCD image sensor 2 and is thereby converted into corresponding electrical signals. The optical system 1 is made up of, for example, a lens system for forming an image of an. object on the CCD image sensor 2, an optical zooming unit for moving the lens system for zooming and a driving system for the optical zooming unit, a focusing system for moving the lens system for focusing, a driving system for the focusing unit, an iris unit and a driving system for the iris system. The CCD image sensor 2 is made up of an optical filter and three CCD image sensors for receiving respective color light beams.

An imaging signal from the CCD image sensor 2 is gain-controlled and sample-held by a signal adjustment circuit 3 and subsequently converted by an analog/digital (A/D) converter 4 into digital imaging signals which are sent to a camera signal processing circuit 5.

The camera signal processing circuit 5 performs digital signal processing of the CCD color camera signals, such as generation of luminance (Y) signals and chroma (C) signals from the digital imaging signals. The camera signals produced by the camera signal processing circuit 5 are outputted at an output terminal 6.

A camera control circuit 9 performs control operations other than the hand deviation correction operations as later explained, such as driving control of the optical zooming unit, driving control for automatic focusing control in the focusing unit, driving control for automatic iris control in the iris unit or timing control for the overall system of the video camera.

A hand deviation correction command unit 16 is a button or the like provided on a video camera casing in order for the video camera user to give a command as to whether or not hand deviation correction is performed. If the user presses the hand deviation correction command unit 16 for commanding hand deviation correction, the camera control unit 9 sends a signal commanding the hand deviation correction to an image control circuit 8.

An angular velocity sensor 12 and an angular velocity sensor 13 are formed each by a piezo-electric oscillation gyro, and are provided on a video camera main body portion so that angular velocity detection surfaces of the sensors 12, 13 will correspond to the horizontal and vertical directions of the CCD image sensor 2, respectively. That is, the angular velocity sensors 12 and 13 detect the angular velocity of the deflection of the video camera main body portion in the yawing and pitching directions, respectively. The angular velocity detection signals from the angular velocity sensors 12, 13 are converted by and A/D converter 11 into digital signals so as to be sent as angular velocity data to the image control circuit 8.

A sync generator (SG) 14 generates a horizontal synchronization signal HD, a vertical synchronization signal VD and a field judgment signal FP. The horizontal synchronization signal HD and the vertical synchronization signal VD are sent to a timing generator (TG) 10, while the field judgment signal FP is sent to an image control circuit 8.

The image control circuit 8 effects control of electrical. zooming of enlarging an image shot by the CCD image sensor 2 and, if fed with a hand deviation command signal from the camera control circuit 9, executes calculations of the correction amount for hand deviation based on angular velocity data from the angular velocity sensors 12, 13 via the A/D converter 11 in accordance with the stored hand deviation correction processing program. Meanwhile, it is not electrical zooming in the image control circuit 9 but the optical zooming by the optical system 1 that is controlled by the camera control circuit 9. If optical zooming is carried out, the relation between the amount of deviation on the CCD image sensor and the angle of deflection of the video camera is changed responsive to the zooming multiplication factor. Thus the image control circuit 8 takes into account the information concerning the zooming multiplication factor in calculating the correction amount of hand deviation.

The correction amount obtained by hand deviation correction calculations by the image control circuit 8 is sent as serial data to the timing generator 10 and to the linear interpolation calculation circuit 7.

Among the serial data transmitted from the image control circuit 8 to the linear interpolation calculation circuit 7, there are a value of enlargement/contraction multiplication factor in the horizontal direction HMAG, a value of enlargement/contraction multiplication factor in the vertical direction VMAG, an interpolation offset value in the horizontal direction HOFF, a vertical interpolation offset value of even fields VOFFE, a vertical interpolation offset value of odd fields VOFFO, a write stop address value HSTOP for a line memory arranged in the linear interpolation calculation circuit 7, a write start address value to a line memory HSTART, a rise phase value for controlling writing/readout to or from the line memory HCPS, a decay phase value for controlling writing/readout to or from the line memory HCPE, a write start phase value for a line memory MWBS, a write end phase value for the line memory WMBE, a readout start phase value for the line memory MRBS and a readout end phase value for the line memory MRBE.

In the instant embodiment, the hand deviation correction processing in the vertical (V) direction and that in the horizontal direction (H) are executed in the following manner.

First, the processing for hand deviation correction in the vertical direction is explained.

In setting an initial value for each field, the image control circuit 8 controls correction of an integer part by offset readout of the CCD image sensor 2 by sending a field readout control signal FLD of the CCD image sensor 2 and a signal representing the value of the number of pixels swept in the vertical direction (VTB) until outputting from the CCD image sensor 2 to the timing generator 10. The image control circuit 8 controls the correction of the fractional part by interpolation by sending out the vertical interpolation offset value of even fields VOFFE and the vertical interpolation offset value of odd fields VOFFO to the linear interpolation calculation circuit 7.

The image control circuit 8 controls line-by-line sequential interpolation by sending the value of enlargement/contraction multiplication factor in the vertical direction VMAG from the image control circuit 8 to the linear interpolation calculation circuit 7, and by sending a VGAT signal specifying the possible presence of carry of a fractional adder portion from the linear interpolation calculation circuit 7 to the timing generator 10 in synchronism with the horizontal synchronization signal HD.

The processing for hand deviation correction in the vertical direction is explained.

In setting an initial value for each field, the image control circuit 8 controls the correction of an integer part by sending the write start address value HSTART and write stop address value SSTOP for the line memory, arranged in the linear interpolation calculation circuit 7, to the linear interpolation calculation circuit 7. In correcting the fractional part, the image control circuit 8 sends the interpolation offset value HOFF for the horizontal direction to the linear interpolation calculation circuit 7 for controlling by interpolation.

The image control circuit 8 controls sequential interpolation on the pixel basis by sending the value of enlargement/contraction multiplication factor in the horizontal direction HMAG to the linear interpolation calculation circuit 7.

In carrying out interpolation of the fractional part, the image control circuit 8 transmits the rise phase value for controlling writing/readout to or from the line memory HCPS, decay phase value for controlling writing/readout to or from the line memory HOPE, write start phase value for a line memory MWBS, write end phase value for the line memory WMBE, readout start phase value for the line memory MRBS and the readout end phase value for the line memory MRBE to the interpolation calculation circuit 7, for carrying out the interpolation of the fractional part in both the horizontal and vertical directions by the linear interpolation calculation circuit 7.

The timing generator 10 transmits frame shift operation control signals XV1 to XV4 equivalent to hand deviation correction amounts to a V-drive 15 taking charge of driving of the CCD image sensor 2, while transmitting a fast drain operation control signal XSUB to the V-drive 15.

Figure 4:
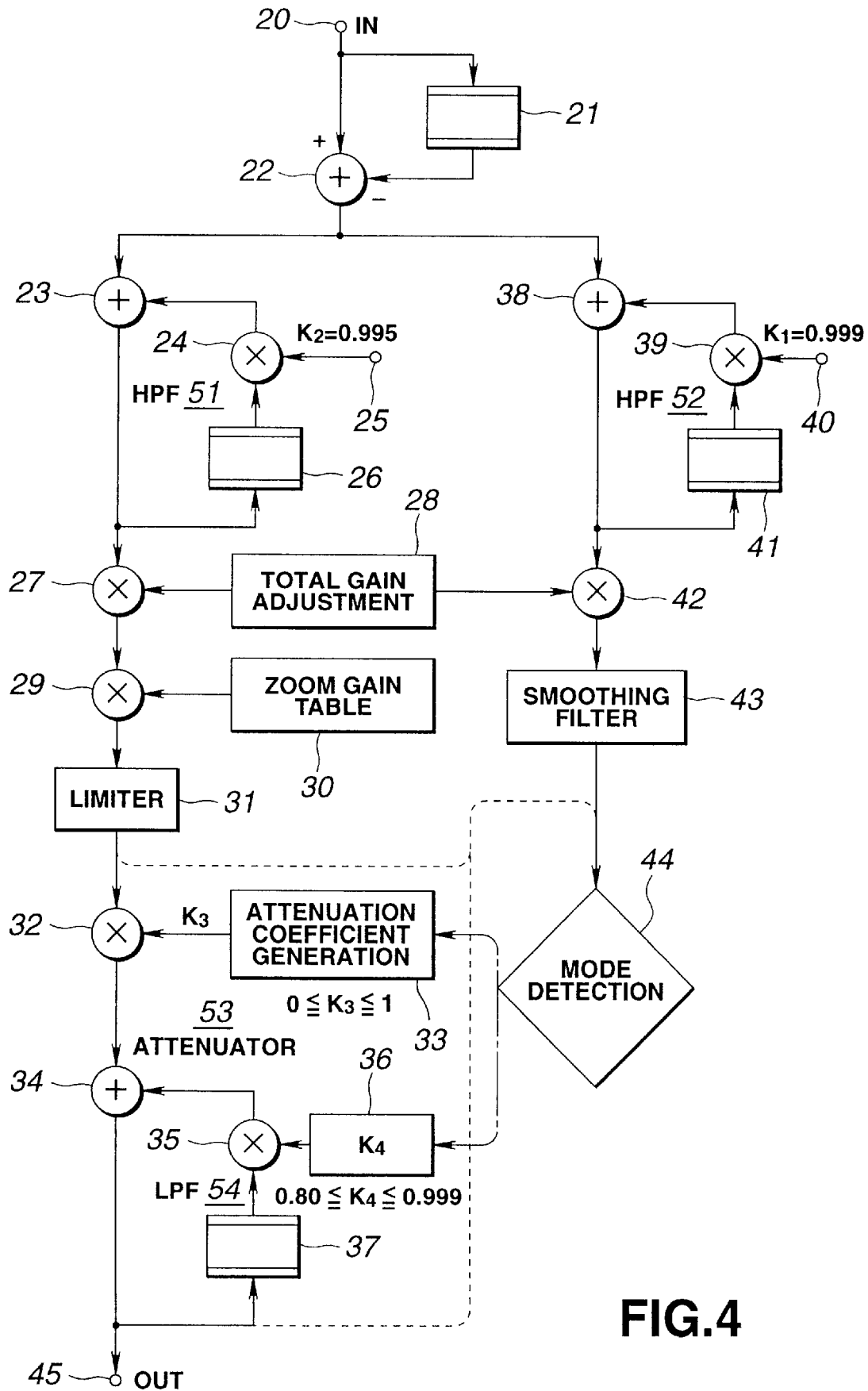
FIG. 4 is a block circuit diagram showing an arrangement for generating hand deviation correction signals provided in an image control circuit of a video camera embodying the present invention.

Referring to FIG. 4, an illustrative arrangement provided in the image control circuit 8 for generating a hand deviation correction signal is now explained.

The arrangement in the image control circuit 8 for generating the hand deviation correction signal is roughly divided into a monitor unit for analyzing video camera deflection using angular velocity data detected by the angular velocity sensors 12, 13, an oscillation detection unit, that is deviation state judgment means, and a calculation unit for calculating the amount of correction of hand deviation responsive to the results of the operation analyses for outputting the hand deviation correction signal, that is deviation correction signal outputting means. The monitor unit is made-up of a high-pass filter 52, a smoothing filter 43 and a mode detection circuit 44, as main component parts, while the calculating unit is made up of high-pass filter 51, a limiter 31, an attenuator 53 and a low-pass filter 54, as main component parts.

Referring to FIG. 4, angular velocity data from the angular, velocity sensors 12, 13, converted by the A/D converter 11 of FIG. 3 into digital signals, are supplied to a terminal 20. The angular velocity data via the terminal 20 is fed as an addition signal to an adder 22, while the angular velocity data via the register 21 is fed as a subtraction signal to the adder 22, so that these angular velocity data are summed in a subtractive manner. An output of the adder 22 is sent to the high-pass filter 51 of the calculation unit and to the high-pass filter 52 of the monitor unit.

The high-pass filter 51 of the calculation unit is made up of an adder 23, registers 26 and 21, an adder 22 and a multiplier 24, and mainly removes low-frequency components caused by panning and tilting of the video camera while directly passing hand deviation components mainly in a frequency range of from 2 to 3 Hz. That is, the adder 23 is fed with angular velocity data from the adder 22 of the previous stage, with output data of the adder 23 being sent via a register 26 to the multiplier 24. The multiplier 24 is fed with pre-set filter coefficients $K_2$ from a terminal 25 and multiplies the output data of the register 26 with the filter coefficient $K_2$. Output data of the multiplier 24 is sent to the adder 23 where it is added to the angular velocity data from the adder 22 of the previous stage. The pre-set filter coefficient $K_2$ is set to, for example, 0.995 ($K_2$=0.955) for raising the cut-off frequency of the high-pass filter 51.

Output data of the high-pass filter 51 is multiplied by a multiplier 27 by a pre-set multiplication coefficient from a total gain adjustment unit 28 and is further multiplied by a multiplier 29 by a multiplication coefficient corresponding to the zooming multiplication factor for optical zooming. The total gain adjustment unit 28 is provided for producing a multiplication coefficient for correcting fluctuations in the gain of the correction signal which is obtained from the optical system 1 and the angular velocity sensors 12, 13 of the video camera and which is not necessarily a design mid value. In a zoom gain table 30 are stored plural multiplication coefficients for gain correction associated with zooming multiplication factors for optical zooming of the video camera. The multiplication coefficients corresponding to the current zooming multiplication factors are read out from the zoom gain table 30 and thence supplied to the multiplier 29.

If the angular velocity data associated with the video camera deviation exceeds a pre-set limit value, that is if the amount of movement velocity of the image on the CCD image sensor, in terms of the number of pixels, caused by video camera deflection, exceeds a pre-set limit value, the limiter 31 limits the data by prohibiting entry of a value exceeding a pre-set limit value to a downstream side low-pass filter 54. The limit value is set in order to permit the mode detection circuit 44 to detect whether the angular velocity data is ascribable to panning or tilting. Output data of the limiter 31, that is the calculated value of the amount of deviation correction, is sent to the multiplier 32 of an attenuator 53.

The attenuator 53 is made up of a multiplier 32 and a attenuation coefficient generator 33 for generating an attenuation coefficient $K_3$ multiplied by the multiplier 32 with output data of the limiter 31, that is the calculated value of the amount of the deviation correction. The attenuator 53 controls the gain of data sent to the downstream side low-pass filter 54. The attenuation coefficient generator 33 outputs the attenuation coefficient $K_3$, having a value such that $0 \leq K_3 \leq 1$, depending on the results of detection by the mode detection circuit 44 of the monitor portion. Output data of the attenuator 53 is sent to a low-pass filter 54.

The low-pass filter 54 is made up of an adder 34, a register 37, a multiplier 35 and an integration coefficient generator 36, and integrates data supplied from the attenuator of the previous stage 53 responsive to respective modes detected by a mode detection circuit 44. That is, output data of the attenuator of the previous stage 53 is fed as an addition signal to the adder 34, output data of which is sent via the register 37 to the multiplier 35. The multiplier 35 is supplied from the integration coefficient generator 36 with a pre-set filter coefficient (integration coefficient $K_4$) which is multiplied by output data of the register 37. Output data of the multiplier 35 is sent to the adder 34 where it is summed to output data of the attenuator 53 of the previous stage. The integration coefficient generator 36 is responsive to the results of detection by the mode detection circuit 44 as later explained to output the integration coefficient $K_4$ having a value such that $0.8 \leq K_4 \leq 0.999$. Output data of the low-pass filter 54 is outputted at a terminal 45 as a hand deviation correction signal.

The high-pass filter 52 of the monitor unit is made up of an adder 38, registers 41 and 21, an adder 22 and a multiplier 39, and removes dc components from the angular velocity data. That is, the adder 38 is fed with angular velocity data from the adder 22 of the previous stage as an addition signal. Output data of the adder 38 is sent via the register 41 to the multiplier 39, which is fed from a terminal 40 with the pre-set filter coefficient $K_1$ which is close to unity, such as 0.999 ($K_1$=0.999). Output data of the register 41 is multiplied with the filter coefficient $K_1$. Output data of the multiplier 39 is sent to the adder 38 where it is summed to the angular velocity data from the adder 22 of the previous stage.

Output data of the high-pass filter 52 is multiplied by the multiplier 42 with the pre-set multiplication coefficient from the total gain adjustment unit 28 before being sent to the smoothing filter 43. The total gain adjustment unit 28 is provided for producing a multiplication coefficient for correcting fluctuations in the gain of the angular velocity signal which is obtained by the angular velocity sensors 12, 13 and which is not necessarily a design mid value.

The smoothing filter 43 is provided for smoothing the supplied data for removing the noise from the data. Specifically, the smoothing filter time-averages four data, namely the current data and three temporally previous data, and outputs the time-averaged data. An output data of the smoothing filter 43 is sent to the mode detection circuit 44.

The mode detection circuit 44 receives output data of the low-pass filter 54 and output data of the smoothing filter 43 of the monitoring unit for a pre-set time of, for example, 0.5 second corresponding to 128 samples. In addition, the mode detection circuit counts, by the limiter 31 of the calculation unit, the number of samples of the angular velocity data exceeding the pre-set limit value, while resetting the count value. Based on these data, the mode detection circuit 44 analyses the state of deflection of the video camera and is responsive to the state of deflection of the video camera to control the attenuation coefficient $K_3$ outputted by the attenuation coefficient generator 33 and to control the integration coefficient $K_4$ outputted by the integration coefficient generator 36.

In the instant embodiment, the attenuation coefficient $K_3$ of the coefficient generator 33 and the integration coefficient $K_4$ of the integration coefficient generator 36 are controlled in the following manner for correcting the deflection of the video camera.

Figure 5:
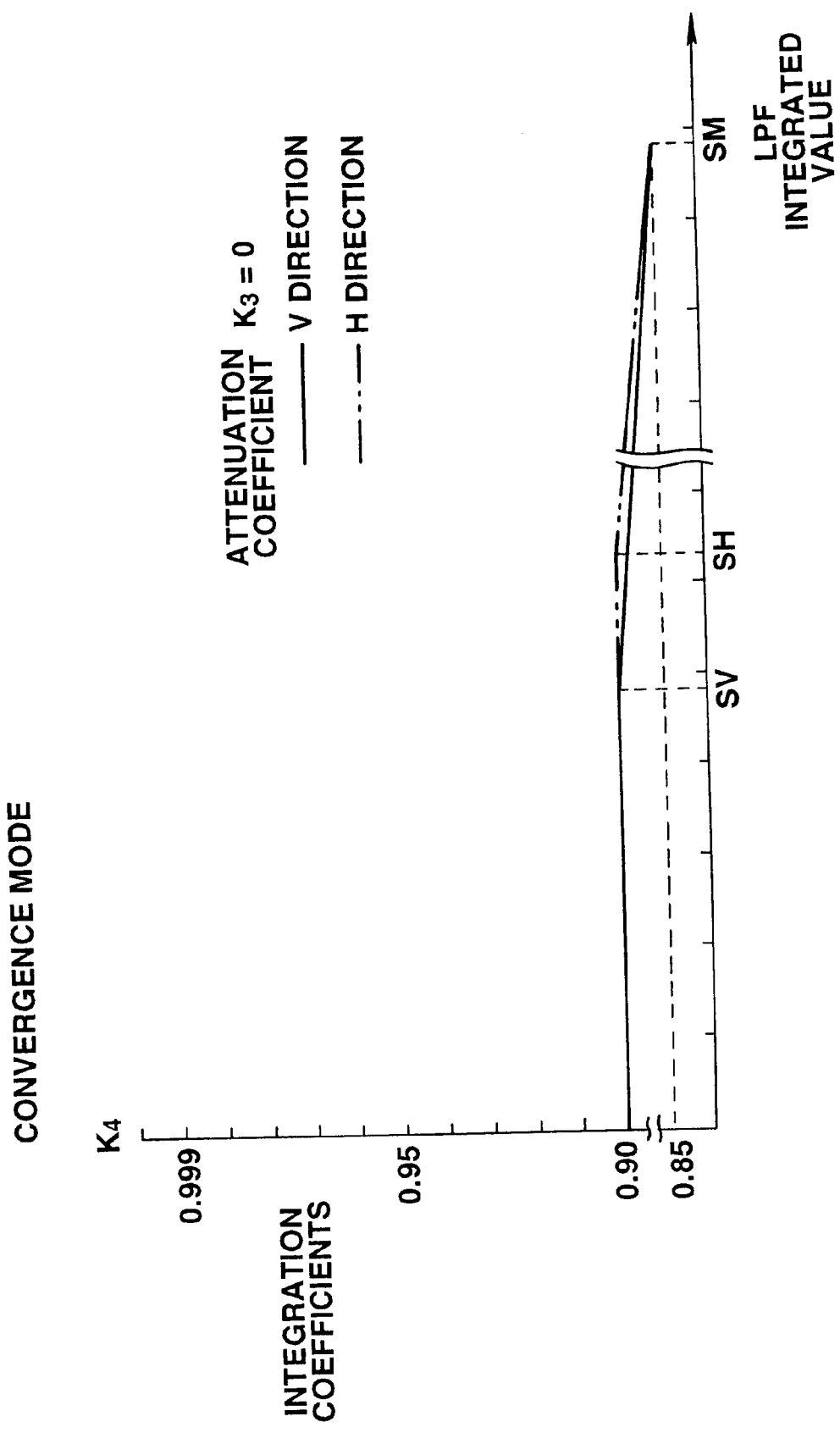
FIG. 5 is a graph showing the relation between integration coefficients and the low-pass filter integrated values for the convergence mode.

The state of deflection of the video camera produced by intentional video camera deflection by the user is deemed to be the panning or tilting motion. In this case, hand deviation correction is avoided as far as possible in order to permit image movement to follow up with the panning or tilting movements. Specifically, as shown in FIG. 5, the attenuation coefficient $K_3$ and the integration coefficient $K_4$ are decreased as far as possible, while an output value of the low-pass filter 54 as a hand deviation correction output is reduced to zero. The correction mode which minimizes the amount of correction, such as during panning or tilting, is termed a convergent mode. Of the low-pass filter integrated values (LPF integrated values) of the low-pass filter of FIG. 5, the integrated values SH and SV correspond to the numbers of pixels equal to one-half an excess area in the horizontal direction and in the vertical direction of the CCD image sensor 2, respectively.

Figure 6:
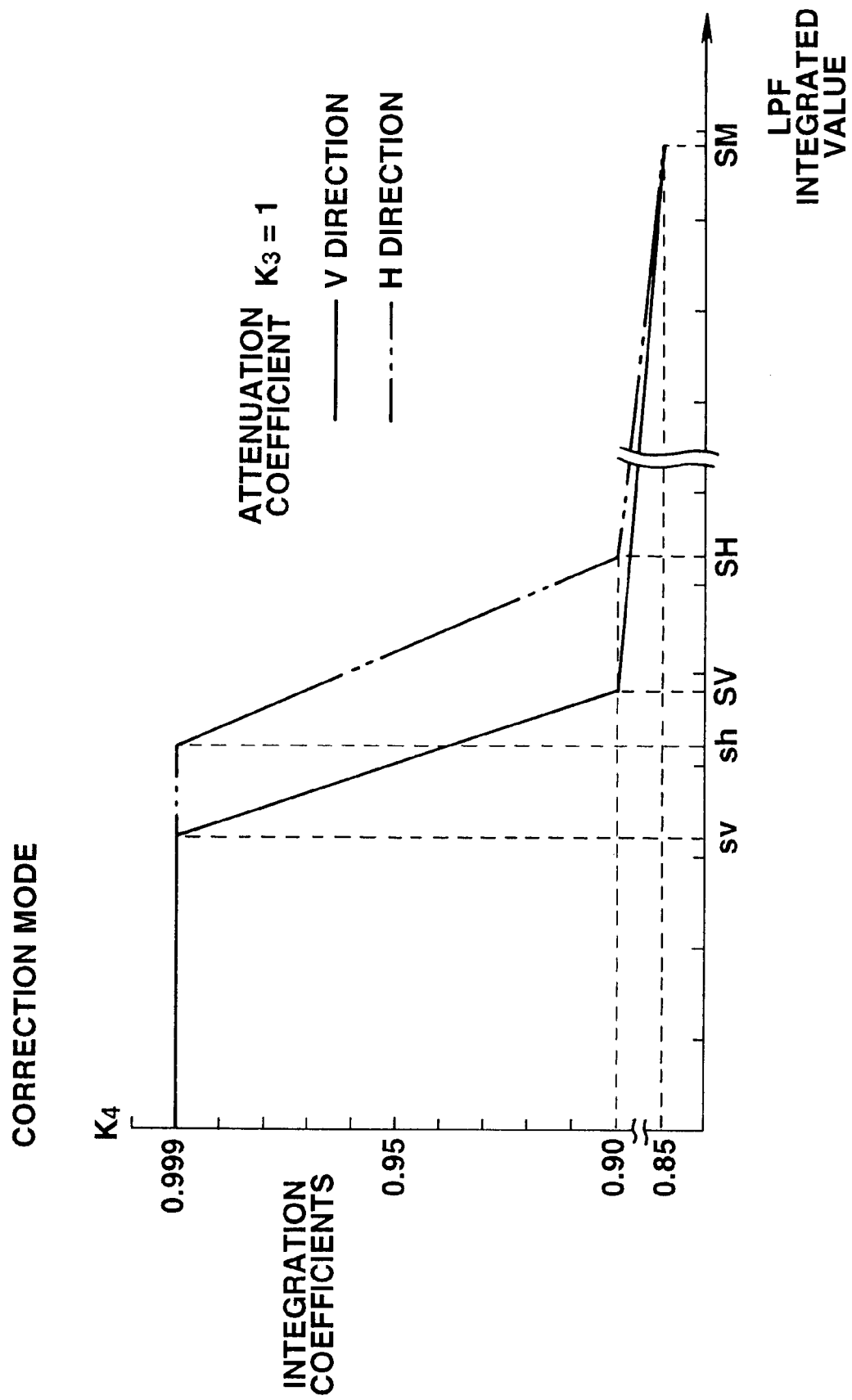
FIG. 6 is a graph showing the relation between integration coefficients and the low-pass filter integrated values for the correction mode.

If the state of video camera deflection is that brought about irrespective of the user's intention, such state is deemed to be that brought about by hand deviation. In such case, hand deviation correction is done to eliminate image deviation as far as possible. Specifically, the attenuation coefficient $K_3$ and the integration coefficient $K_4$ are set so as to be as close to unity as possible so that the calculated values of hand deviation correction directly prove to be an output value of the low-pass filter 54, as shown in FIG. 6. Such mode of the correction operation in which the amount of correction is increased as far as possible, that is to close to 100%-correction, such as when the video camera is deflected regardless of the user's will, is termed a correction mode. Of the LPF integrated values of FIG. 6, the integrated values SH and SV correspond to the numbers of pixels equal to one-half of the excess areas in the horizontal direction and in the vertical direction of the CCD image sensor 2, respectively. In case of correction with the above correction mode in a stationary state, an area less than one-half the number of pixels of the excess areas in each of the horizontal and vertical directions of the CCD image sensor 2 represents an area usable for hand deviation correction. However, if the areas equal to one-half the excess area of the numbers of pixels in the horizontal and vertical directions in the stationary state are used in their entirety for correction, image continuity is lost if the area equal to one-half the excess area is exceeded. Thus, in effect, an area less than one-half the number of pixels of the excess area by a pre-set number of pixels, that is up to an LPF integrated value of sh in the horizontal direction and up to an LPF integrated value of sv in the vertical direction, is used for correction. Beyond these LPF integrated values, the integration coefficient $K_4$ is reduced for reducing the amount of correction for convergence.

Figure 7:
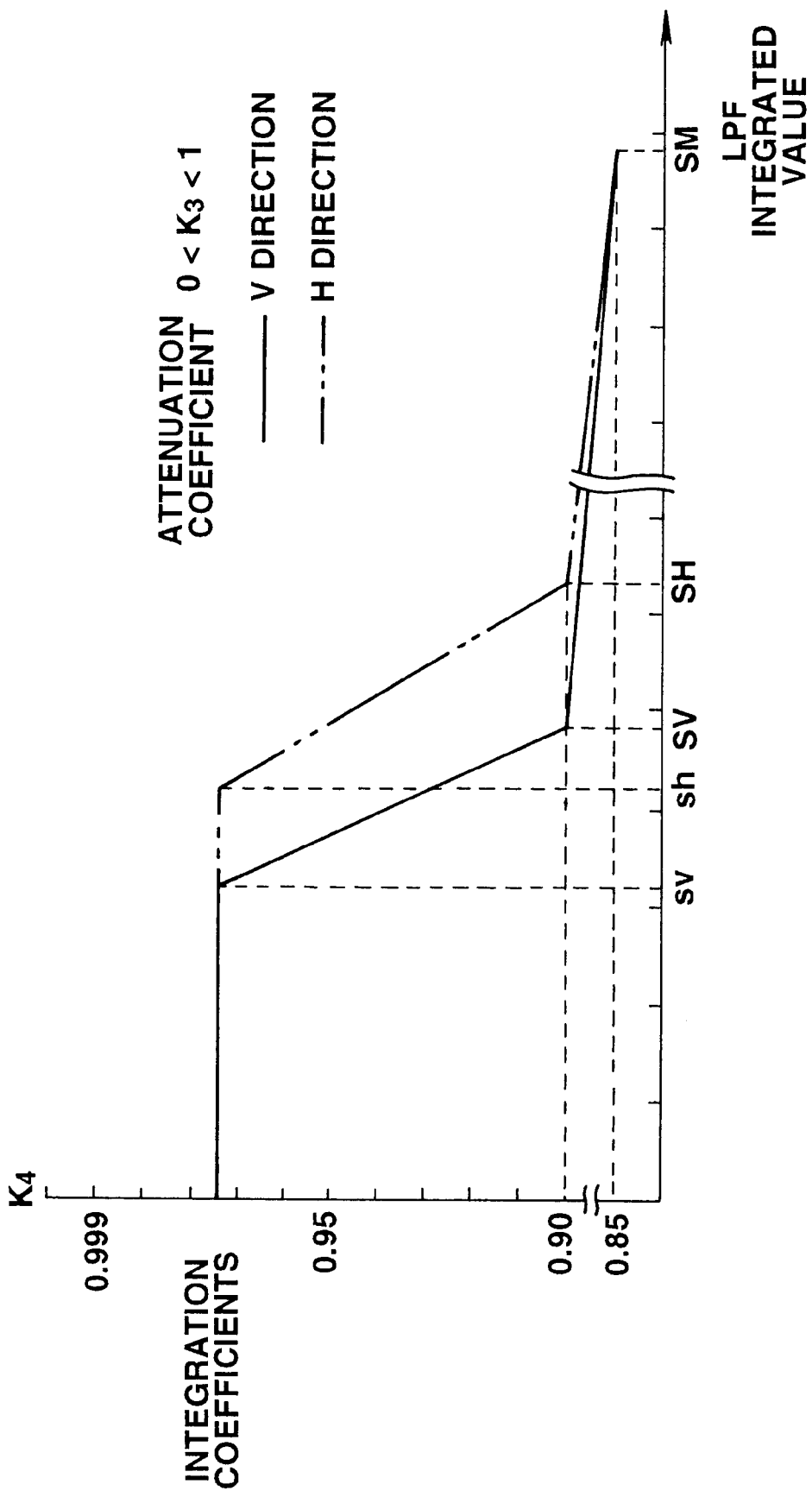
FIG. 7 is a graph showing the relation between integration coefficients and the low-pass filter integrated values for the pseudo-correction mode.

If the state of video camera deflection is an intermediate state between the panning or tilting operation in which the user intentionally deflects the video camera and the hand deviation in which the video camera is deflected regardless of the will of the user, the correction is convergence combined with hand deviation correction. Specifically, the attenuation coefficient $K_3$ and the integration coefficient $K_4$ are set to proper values so that correction and convergence will be carried out in combination, as shown in FIG. 7. The correction mode which is intermediate between the panning or tilting and hand deviation is termed a sub- or quasi-correction mode. Of the LPF integrated values of FIG. 7, the integrated values SH and SV correspond to the numbers of pixels equal to one-half the excess areas in the horizontal and vertical directions of the CCD image sensor 2, respectively. In case of the correction in the sub-correction mode under the stationary state, the area usable for hand deviation correction is less than one-half the number of pixels of the excess area in each of the horizontal and vertical directions of the CCD image sensor 2. However, if the areas equal to one-half the excess area of the numbers of pixels in the horizontal and vertical directions in the stationary state are used in their entirety for correction, image continuity is lost if the area equal to one-half the excess area is exceeded. Thus, in effect, an area less than one-half the number of pixels of the excess area by a pre-set number of pixels, that is up to an LPF integrated value of sh in the horizontal direction and up to an LPF integrated value of sv in the vertical direction, is used for correction. Beyond these LPF integrated values, the integration coefficient $K_4$ is reduced for reducing the amount of correction for convergence.

The above-mentioned attenuation coefficient $K_3$ has a relation of $K_{3X} < K_{3Y} < K_{3Z}$, while the integration coefficient $K_4$ has a relation of $K_{4X} < K_{4Y} < K_{4Z}$. In these inequalities, X, Y and Z represent the convergence mode, sub-correction mode and the correction mode under the stationary state, respectively. In the instant embodiment, correction for video camera deflection is done using one of the convergence mode, sub-correction mode and the correction mode. Which of these modes is used is determined on the basis of analyses of the state of video camera deflection by the mode detection circuit 44.

The criteria for mode judgment (conditions for decision) by the mode detection circuit 44 and the correction operation by the hand deviation correction device of the instant embodiment responsive to the results of mode judgment are now explained.

Figure 8:
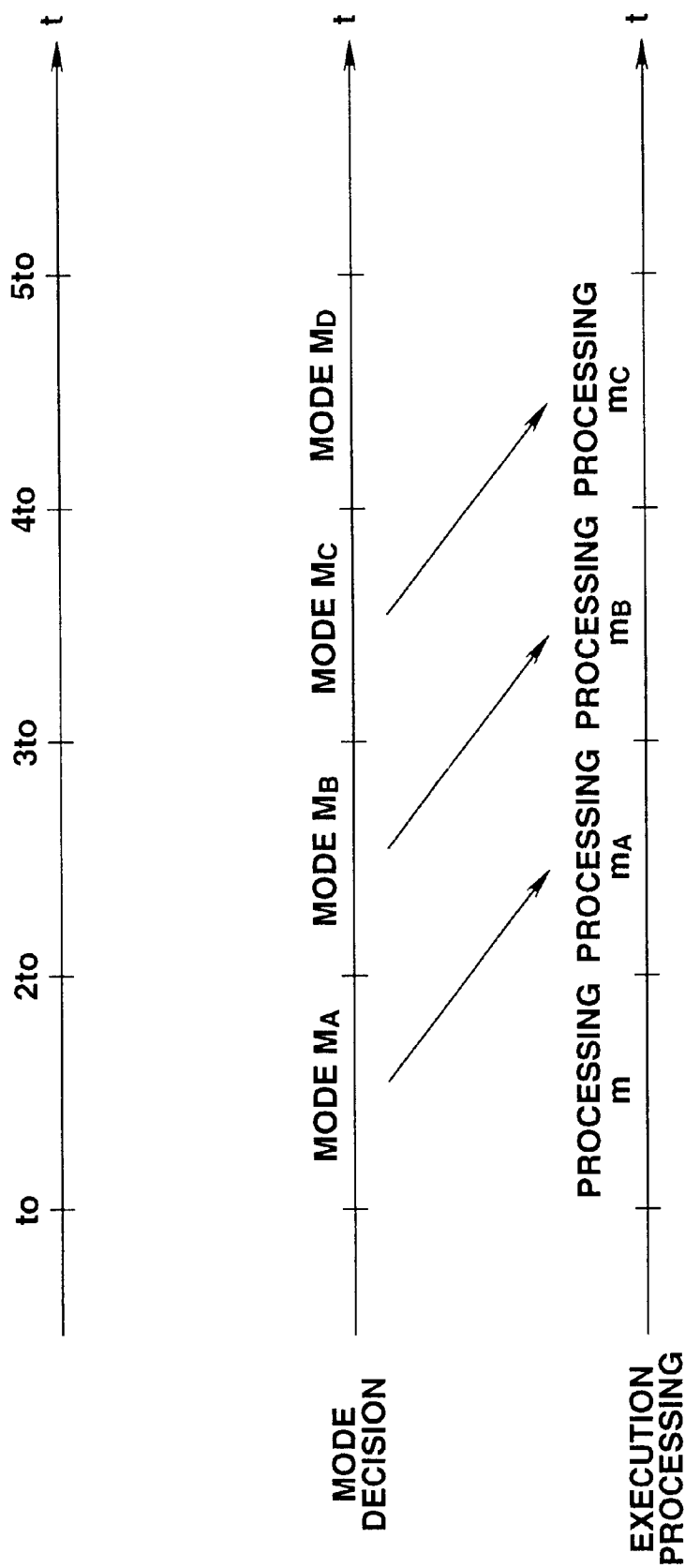
FIG. 8 illustrates the flow of mode decision and execution processing.
Figure 9:
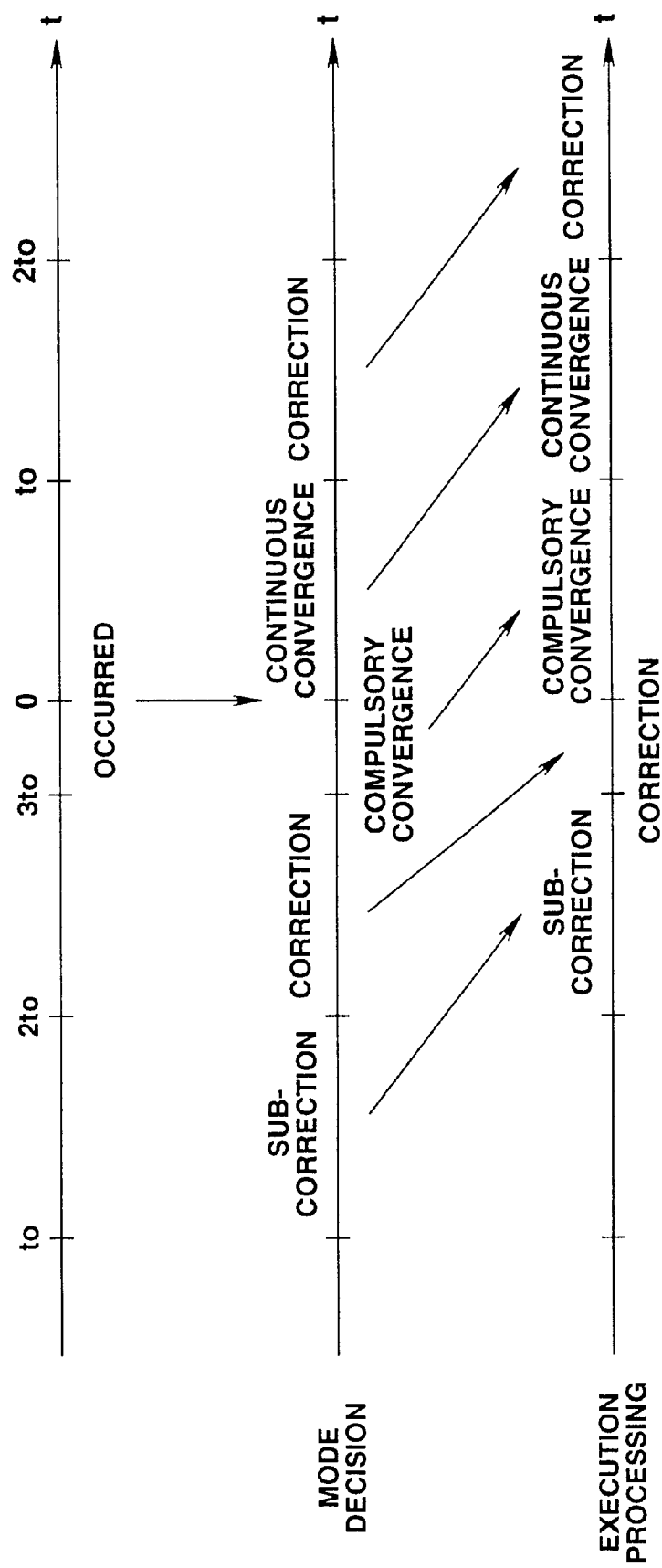
FIG. 9 illustrates the flow of processing for execution of mode decision correction stating specified modes.

With the hand deviation correction device of the instant embodiment, mode decision is made under seven sorts of decision conditions as later explained in connection with FIGS. 11 to 17 by the mode detection circuit 44 for a pre-set time of $t_0$ seconds corresponding to, for example, 128 samples of the angular velocity data, as shown in FIG. 8. For the next following pre-set time duration as from $t_0$ until $2t_0$, the correction operation is performed responsive to the results of decision and further the mode decision is given for the next pre-set time duration. In the case of the compulsory convergence mode, as explained subsequently, compulsory interrupt is performed as soon as the decision condition for the compulsory convergence mode is set, no matter which of the modes is then in effect, for instantly carrying out the convergence mode operation, as shown in FIG. 9.

Figure 10:
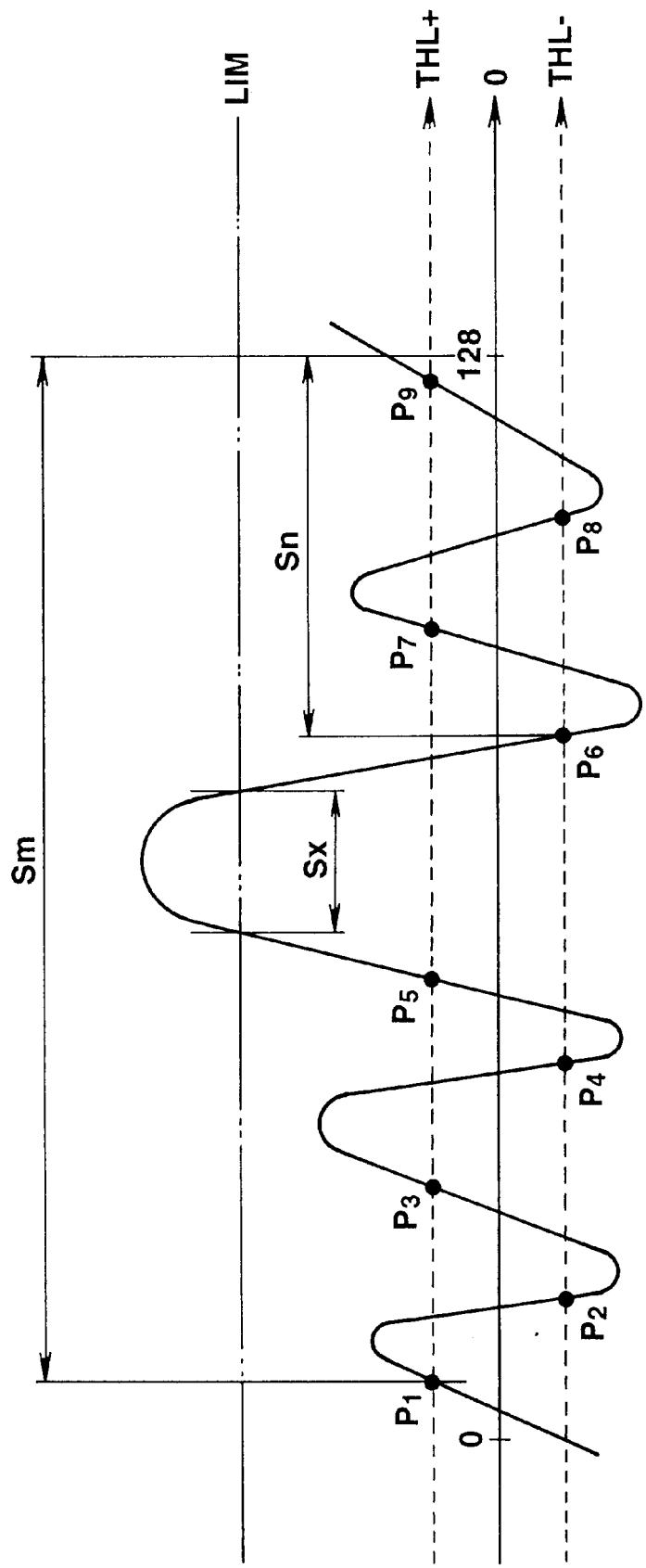
FIG. 10 illustrates definitions of various terms.

The number of zero-crossings of the angular velocity data used in the following explanation of mode decision is defined as shown in FIG. 10. In this figure, the number of samples of angular velocity data in a pre-set time duration (128 samples) is Sm, the number of samples within a pre-set threshold level (THL$_+$ or THL$_-$) is assumed to be zero, the number of samples of the angular velocity data crossing the threshold level within the pre-set time duration, that is the number of reversions of the signs of the angular velocity data of the 128 samples, is Pn and the number of samples of the angular velocity data values exceeding the pre-set limit value LIM of the limiter 31 (for example, LIM=8) is Sx. If the number of samples of the angular velocity data exceeds the limit value LIM of the limiter 31 of 50 (LIM=8, for example) on end, the count of the number of zero-crossings is reset and the number of samples as from the first zero-crossing point since the count reset until the end of the pre-set time duration is Sn. Thus, in FIG. 10, Pn=9 and the number of samples S=Sm for Sx<50, while Pn=4 and the number of samples S=Sn for Sx≧50.

Under the following presuppositions, the mode detection circuit 44 effects mode decision under the following mode decision conditions. The hand deviation correction device of the instant embodiment performs deflection correction based on the result of mode decision.

Figure 11:
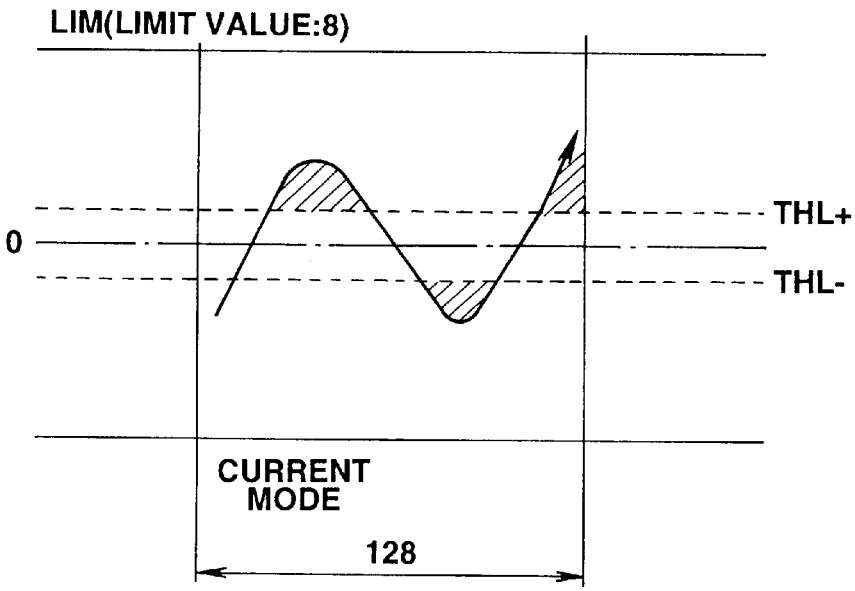
FIG. 11 illustrates decision conditions for the correction mode.
Figure 12:
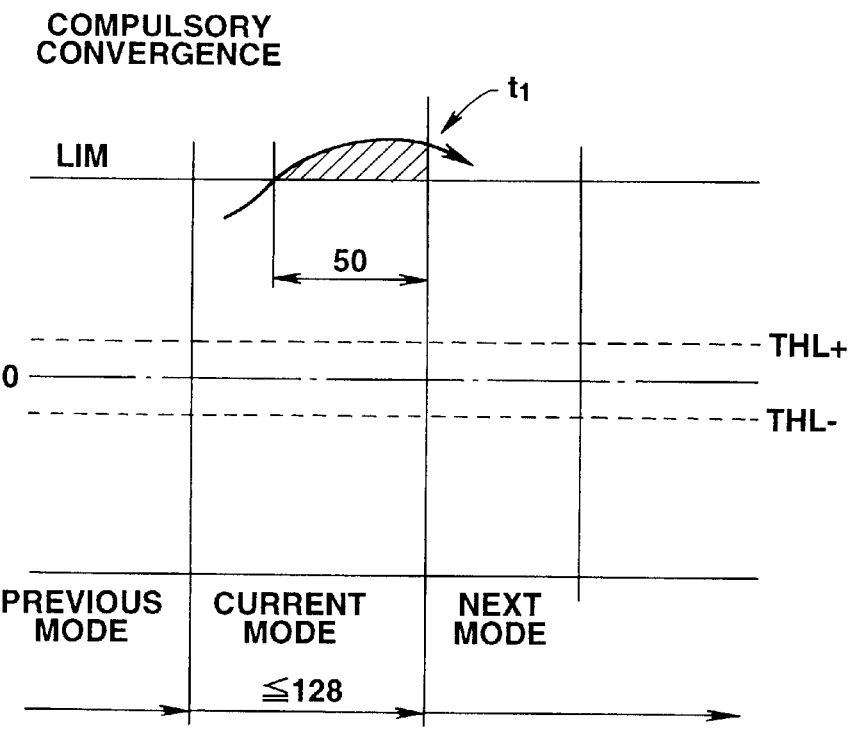
FIG. 12 illustrates decision conditions for the compulsory convergence mode.

If, at the time of judging the current mode, the number of continuous samples of the angular velocity data exceeding the pre-set limit value LIM (LIM=8 for sample) does not exceed 50 samples and the number of zero-crossings of the angular velocity data crossing the threshold level (THL$_+$ or THL$_-$) is not less than 3 and not more than 7, as shown in FIG. 11, the processing mode is the correction mode shown in FIG. 6. That is, under the processing under the stationary state in which the condition for decision is met, the attenuation coefficient $K_3$ is set to 1 and the integration coefficient $K_4$ of FIG. 6 is used as from the 129th sample, that is the sample next to the lapse of the pre-set time duration of the mode decision, by way of performing the correction mode operation. Since the sample frequency fs is 240 Hz in the instant embodiment, the time elapsed until the 129th sample is about 0.5 sec.

If the previous mode is the correction mode or the sub-correction mode and, at the time of judging the current mode, the number of samples of the angular velocity data exceeding the pre-set limit value LIM (LIM=8 for example) exceeds 50 samples on end, the processing mode is compulsorily set to the convergence mode shown in FIG. 5. That is, under the stationary state processing in which the above decision condition has been met, the mode compulsorily enters the convergence mode as from the time t1 when the condition for decisions has been met. Thus the processing is carried out using the attenuation coefficient $K_3$ (=0) and the integration coefficient $K_4$ (=0.9) as shown in FIG. 5. Meanwhile, if the correction mode or the sub-correction mode exists in the former half of the time duration of decision of the current mode, the compulsory convergence mode is preferred if the above decision condition has been met.

If the previous mode is the compulsory convergence mode or the continuous convergence mode, as now explained, and angular velocity data exceeding the pre-set limit value LIM (LIM=8 for example) continues for 50 samples on end at the time of judging the current mode, the processing mode is continuously set to the convergence mode shown in FIG. 5. That is, under the stationary state processing in which the above decision condition has been met, continuous convergence mode processing is carried out with the attenuation coefficient $K_3=0$ and the integration coefficient $K_4$ (=0.9) of FIG. 5 even after the 129th sample next following the pre-set time duration of the mode decision, that is after the first sample of the next following pre-set time duration. If the correction mode is entered during the latter half of the time decision of the current mode, the correction mode is preferred.

Figure 15:
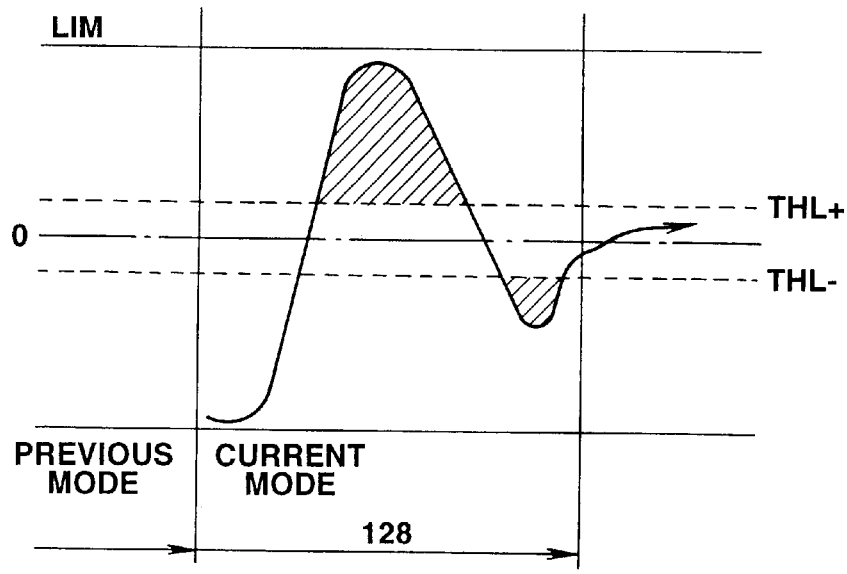
FIG. 15 illustrates decision conditions for the quasi-correction mode.
Figure 16:
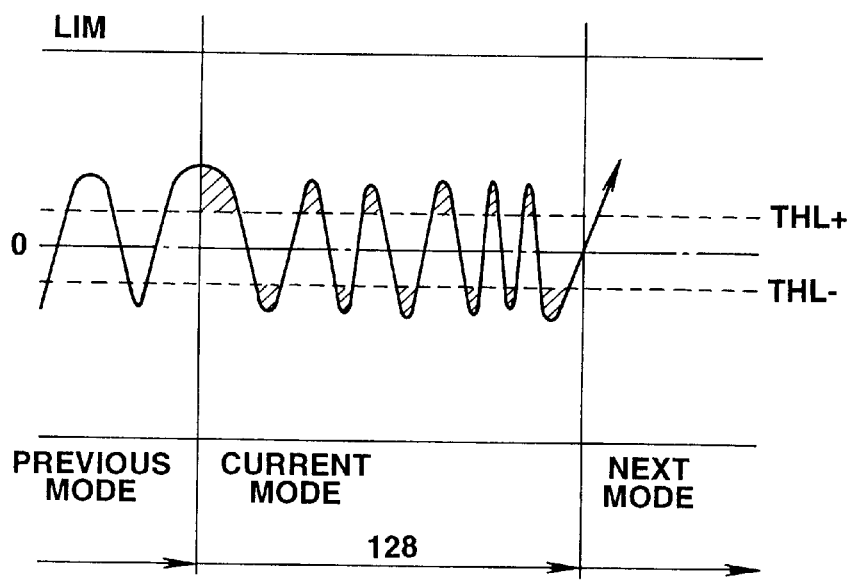
FIG. 16 illustrates mode decision conditions for not making mode decision by noise in the angular velocity data instead of by inherent vibrations in the video camera.
Figure 17:
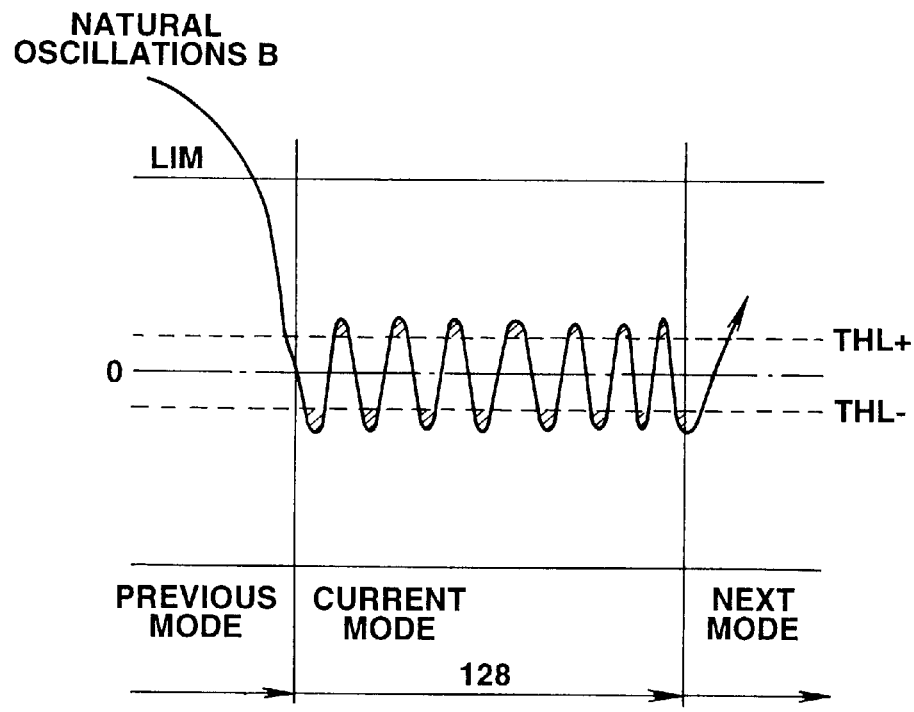
FIG. 17 illustrates mode decision conditions for not making mode decision by inherent vibrations in the video camera.
Figure 18:
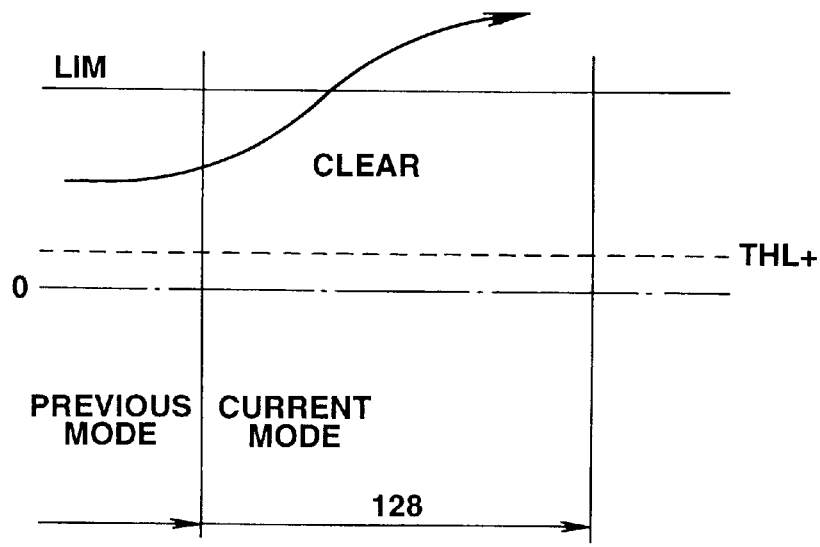
FIG. 18 illustrates count clear of the number of continuous samples of the angular velocity data exceeding a pre-set limit value and the condition for re-count operations (for a case of proceeding to the current mode decision domain with the last value of the previous mode being less than a limit value).

If 128 samples of the angular velocity data are not in excess of the pre-set threshold level ($THL_+$ or $THL_-$), as shown in FIG. 15, the processing mode is set to the convergence mode shown in FIG. 5. That is, in the processing under the stationary state in which the above condition for decision is met, processing under the stationary convergence mode is carried out, using the attenuation coefficient $K_3=0$ and the integration coefficient $K_4$ (=0.9) of FIG. 5, as from the 129th sample next to the pre-set time duration of the mode decision, that is the first sample of the next following pre-set time duration. The threshold level is set as the maximum value of output data of the high-pass filter 52 when the video camera is stationarily set on a tripod or on a desk.

If, at the time of decision of the current mode, 50 continuous samples of the angular velocity data exceeding the limit value LIM of the limiter 31, such as LIM=8, are not produced on end, the number of zero-crossings of the angular velocity data crossing pre-set threshold level ($TH_+$ or $TH_-$) is not more than two and the processing mode is not the stationary convergence mode, the processing mode is set to the sub-correction mode shown in FIG. 7. That is, under the stationary state processing in which the above decision condition has been met, the above-mentioned sub-correction mode processing is carried out with the attenuation coefficient $K_3<1$ and the integration coefficient $K_4$ of FIG. 7 as from the 129th sample next following the pre-set time duration of the mode decision, that is after the first sample of the next following pre-set time duration.

If the previous mode is the correction mode and, at the time of decision of the current mode, 50 continuous samples of the angular velocity data exceeding the limit value LIM of the limiter 31, such as LIM=8, are not produced on end, and the number of zero-crossings of the angular velocity data crossing pre-set threshold level ($THL_+$ or $THL_-$) is more than eight, the processing mode is set to the correction mode shown in FIG. 6. That is, under the processing in the stationary state in which the present condition for decision is met, the correction mode operation is carried out using the integration coefficient $K_4$ of FIG. 6, within the pre-set time duration during which the mode decision is given. The reason of employing the correction mode when the condition for decision has been met is to avoid giving a mistaken decision by the noise in the angular velocity data instead of by inherent video camera vibrations.

Figure 13:
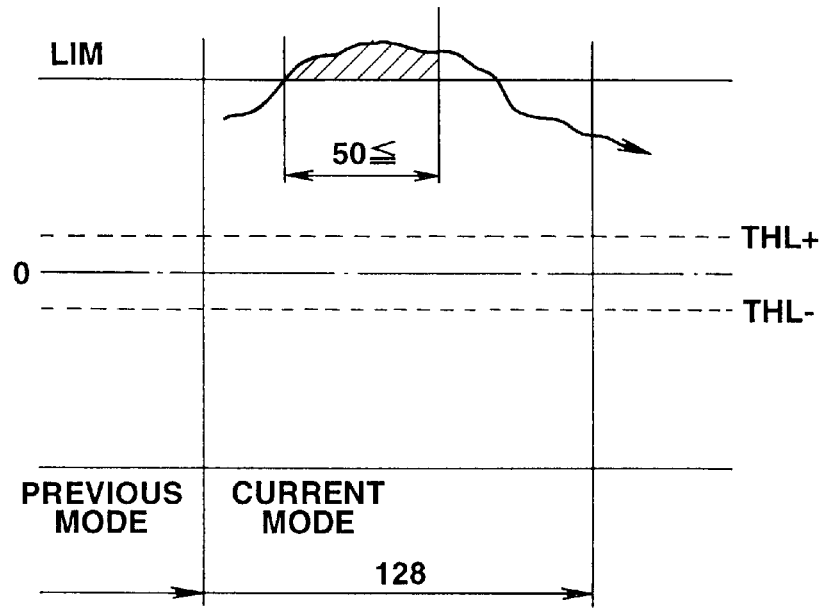
FIG. 13 illustrates decision conditions for the continuous convergence mode.
Figure 14:
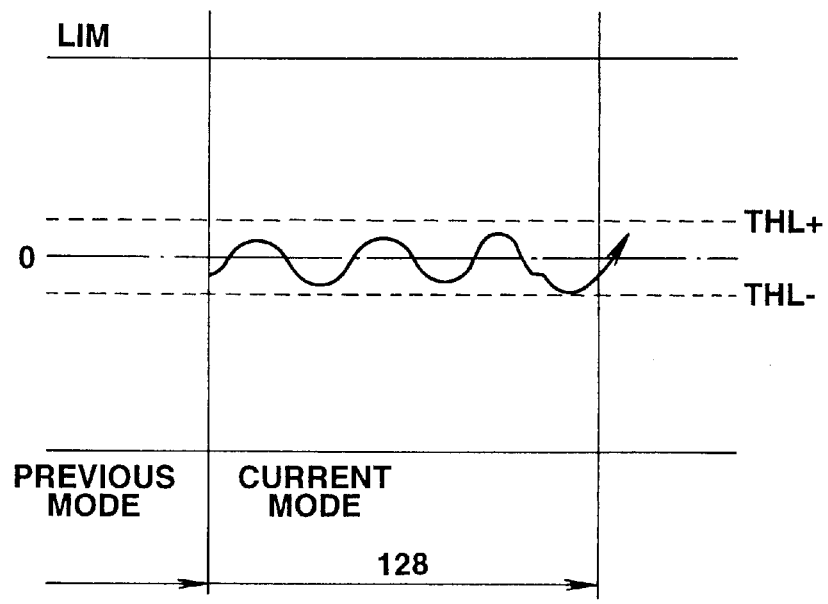
FIG. 14 illustrates decision conditions for the stationary convergence mode.

If the previous mode is other than the correction mode and, at the time of decision of the current mode, 50 continuous samples of the angular velocity data exceeding the limit value LIM of the limiter 31, such as LIM=8, are not produced on end, and the number of zero-crossings of the angular velocity data crossing pre-set threshold level ($THL_+$ or $THL_-$) is more than eight, the processing mode is set to the continuous convergence mode shown in FIG. 13. That is, under the processing in the stationary state in which the present condition for decision is met, the continuous convergence mode operation is carried out using the integration coefficient $K_4$ (=0.9) of FIG. 5, within the pre-set time duration during which the mode decision is given. The reason of employing the continuous convergence mode when the condition for decision is met is the fact that the angular velocity data is based on inherent video camera vibrations.

For mode decision, the mode detection circuit 44 performs counting angular velocity data exceeding the pre-set limit value LIM of the limiter 31 with the count value in a range of 00h to 0Fh, resetting the count value and recounting under the following conditions.

Figure 19:
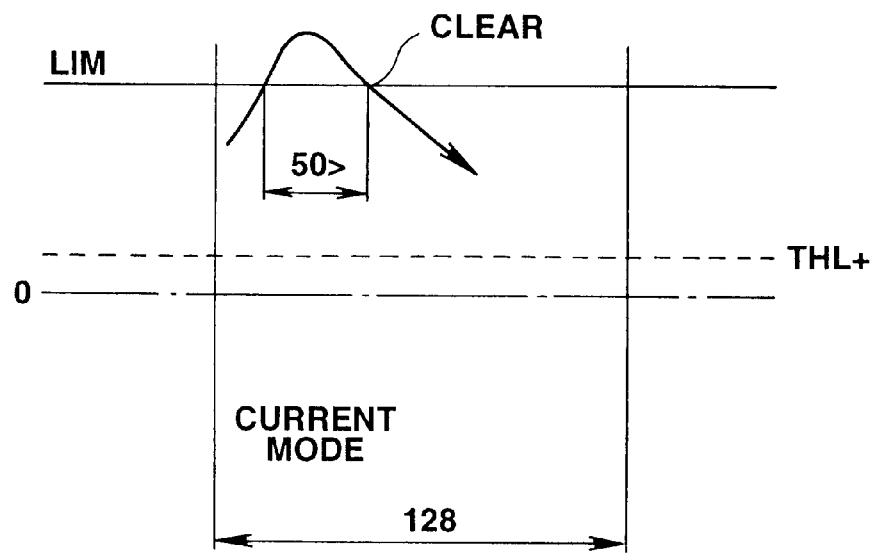
FIG. 19 illustrates count clear of the number of continuous samples of the angular velocity data exceeding a pre-set limit value and the condition for re-count operations (for a case of the value of the angular velocity data assuming a value smaller than a limiter value during the count operation).
Figure 20:
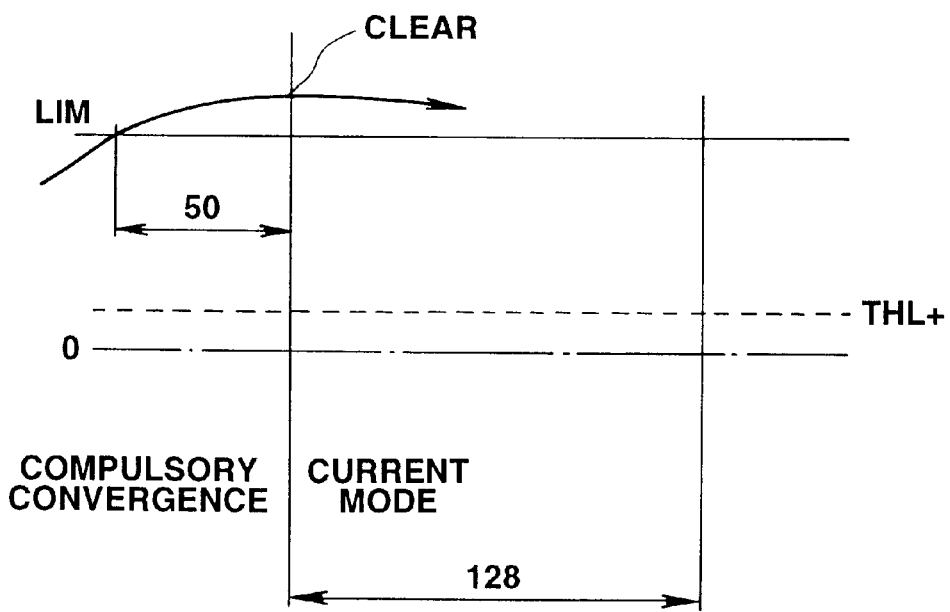
FIG. 20 illustrates count clear of the number of continuous samples of the angular velocity data exceeding a pre-set limit value and the condition for re-count operations (for a case of proceeding to the next mode judgment domain after establishment of the compulsory convergence mode).

That is, the mode detection circuit 44 clears the count value of the angular velocity samples exceeding the pre-set limit value LIM for starting the recounting operation, under the following conditions: If the current mode decision domain (pre-set time duration) is entered when the final value of the angular velocity data of the previous mode decision time period (pre-set time duration) is smaller than the pre-set limit value LIM, the count value is cleared. Also, if the count value is smaller than 50 and the angular velocity data assumes a value smaller than the limit value LIM during the operation of counting angular velocity data exceeding the limit value LIM, as shown in FIG. 19, the count value is cleared. Also, if the compulsory convergence mode has been set in the previous mode and the time period proceeds to the next current mode decision time period, the count value is cleared.

Figure 21:
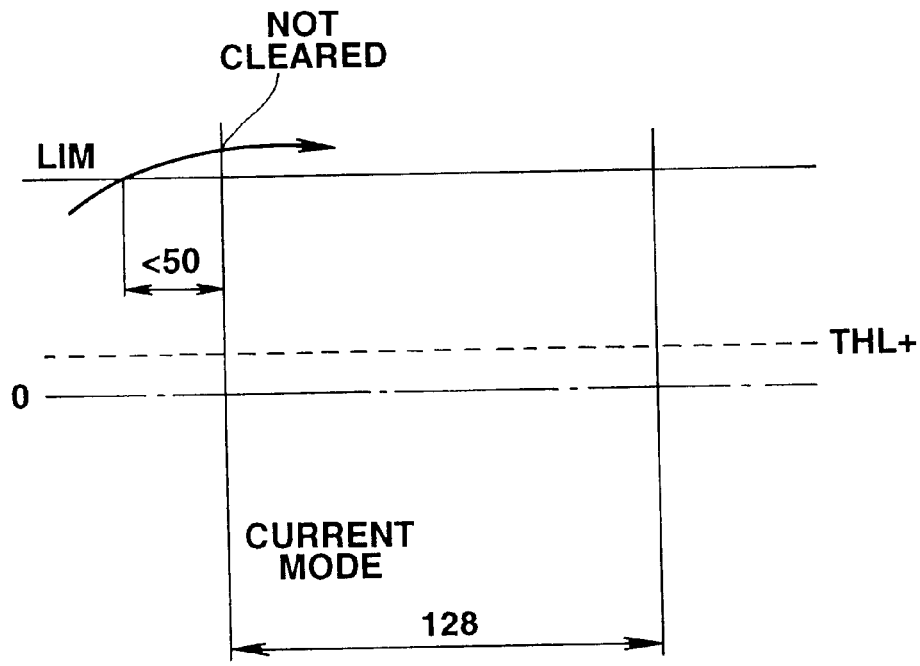
FIG. 21 illustrates the condition for continuing the count operation without clearing the count of the continuous sample number of angular velocity data exceeding a pre-set limit value (for a case of proceeding from the current mode decision to the next judgment domain during the operation of counting angular velocity data exceeding a limit value).
Figure 22:
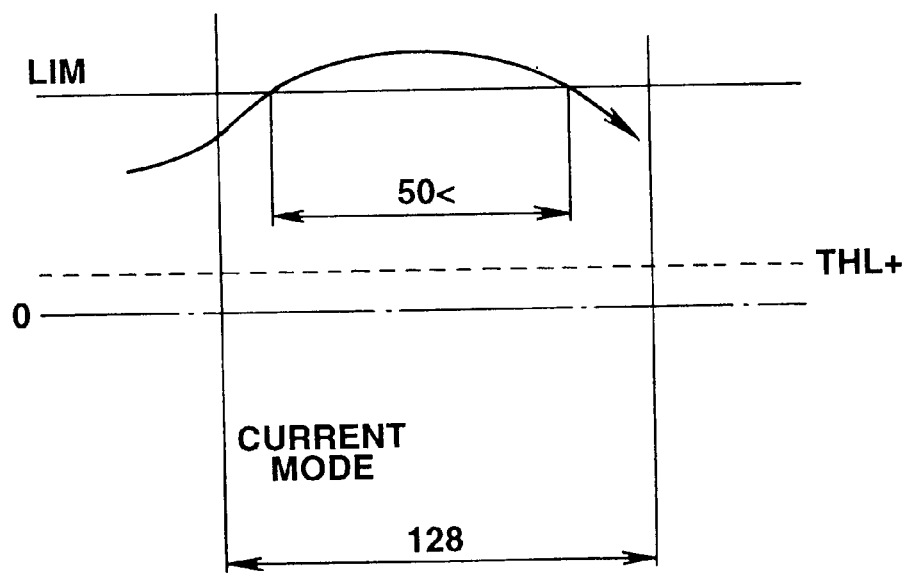
FIG. 22 illustrates the condition for holding a count value of the number of continuous samples of angular velocity data exceeding a pre-set limit value (for a time point when the count value of angular velocity data exceeding a limit value reaches a pre-set value at the time of judging the current mode, with the previous mode being the compulsory convergence mode or the continuous convergence mode).

On the other hand, if the previous mode is not the compulsory convergence mode, the last value (the last angular data sample value) of the previous mode decision time period has assumed a value larger than the limit value LIM, with the count value being smaller than 50, and the mode decision time period transfers from the previous mode decision time period to the current mode decision time period, the count value is not cleared, but the count operation is continued, as shown in FIG. 21. If the previous mode is the compulsory convergence mode or the continuous convergence mode, and the count value of the angular velocity data exceeding the limit value LIM duringcurrent made decision has become equal to or exceeded 50, as show n in FIG. 22, the limit flag is set and the count value is held at 51. However, if, after setting the limit flag, zero-crossing of the angular velocity data value has occurred during the dame decision time period (current mode decision time period) or the mode is judged to be the correction mode, the count value is cleared.

In the above example, mode decision by the mode detection circuit 44 is performed under the above-mentioned seven sorts of the mode decision conditions. However, alternatively, the correction mode and the convergence mode may be re-defined so that the sub-correction mode will be comprised within one of the two re-defined modes. At this time, correction coefficients represented by the attenuation coefficient $K_3$ and the integration coefficient $K_4$ shown in FIGS. 5 to 7 are changed simultaneously. The continuous convergence mode and the compulsory convergence mode may be defined and processed as being one mode. It is also possible to regard the modes other than the correction mode and the stationary convergence mode as being the same mode without setting the decision employing angular velocity data exceeding the pre-set limit value in the limiter 31. A number of correction algorithms may be envisaged in addition to those stated in the above embodiments.

If mode decision is done as described above and processing is performed depending on the modes thus set, the correction operation is switched during mode transition, so that smooth picture movement possibly cannot be achieved.

Thus, in the present embodiment, the following technique is used to accord continuity to the attenuation coefficient $K_3$ and the integration coefficient $K_4$ for smoothing the picture movement during mode transition. Although mode transition is comprised of six cases, namely transition from the correction mode to the convergence mode, that from the convergence mode to the correction mode, that from the correction mode to the sub-correction mode, that from the sub-correction mode to the correction mode, th at from the convergence mode to the sub-correction mode and that from the sub-correction mode to the convergence mode, the processing method is the same for any of these cases. Therefore, the following explanation is made for the case of transition from the correction mode to the convergence mode, while the explanation of the remaining cases is omitted.

The integration coefficient $K_4$ in the vertical (V) direction is not changed with the modes for the domain of the integrated value of the low-pass filter 54 from SV to SM, as shown in FIGS. 5 to 7. Therefore, it is unnecessary to accord continuity to the coefficient for this domain. On the other hand, the integration coefficient $K_4$ in the horizontal (H) direction is not changed with the modes for the domain of the integrated value of the low-pass filter 54 from SV to SM. Therefore, it is similarly. unnecessary to accord continuity to the coefficient for this domain.

Figure 23:
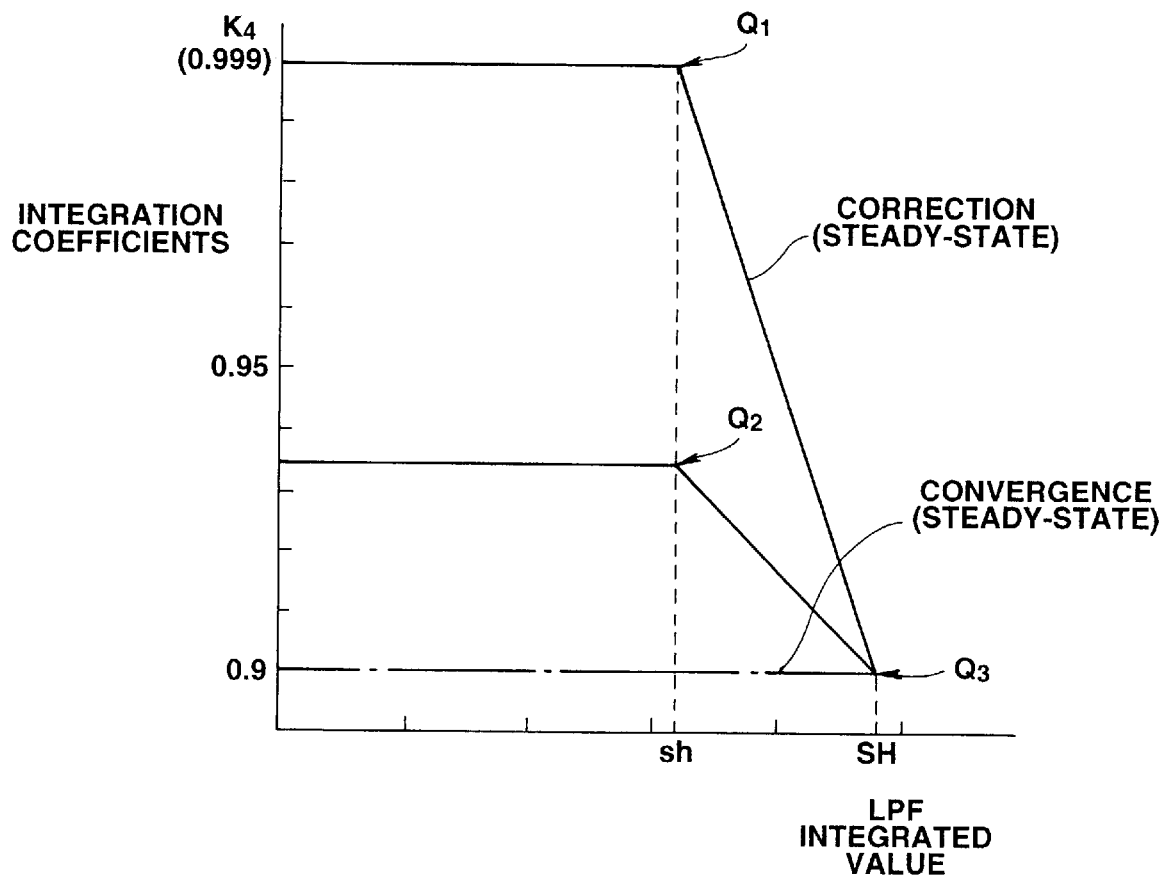
FIG. 23 illustrates mode switching during mode transition.

Referring to FIG. 23, processing in the vertical direction for the domain from (0) to SH of the integrated value of the low-pass filter 54 is now explained.

Considering a point $Q_1$ in FIG. 23, if the mode is to be switched continuously from the correction mode to the convergence mode, it is necessary to change the integration coefficient $K_4$ continuously from 0.999 to 0.9 during the time of 128 samples. For transition from the correction mode to the convergence mode, the domain between the value of 0.999 of the integration coefficient $K_4$ for the correction mode and the value of 0.9 of the integration coefficient $K_4$ for the convergence mode, that is the domain from 0.999 to 0.9, is divided by 128 samples, so that the integration coefficient $K_4$ is decreased by 0.099/128 for each sample. For the domain of the integrated value of the low-pass filter 54 from (0) to sh, the integration coefficient $K_4$ is decreased in this manner by 0.099/128 for each sample. For the domain of the integrated value of the low-pass filter 54 from sh to SH, a point $Q_2$ found by decreasing the integration coefficient $K_4$ of the point $Q_1$ by 0.099/128 for each sample and a fixed point $Q_3$ is interconnected by a line segment based on which the integration coefficient $K_4$ corresponding to the current integration coefficient of the low-pass filter 54 is found.

Thus, during transition from the correction mode to the convergence mode, the above processing is continuously performed for 128 samples on end for the domain of the integrated value (0) to the integrated value sh, for the domain of the integrated value sh to the integrated value SH and for the domain of the integrated value SH to the integrated value SM, for maintaining continuity of the integration coefficient $K_4$.

As for the processing of according continuity to the attenuation coefficient $K_3$, since the attenuation coefficient $K_3$ is not a function of the integrated value of the low-pass filter 54, it suffices to decrease the integration coefficient $K_4$ by (1−0)/128 for each sample for the value of from 1 to 0 of the attenuation coefficient $K_3$.

Figure 24:
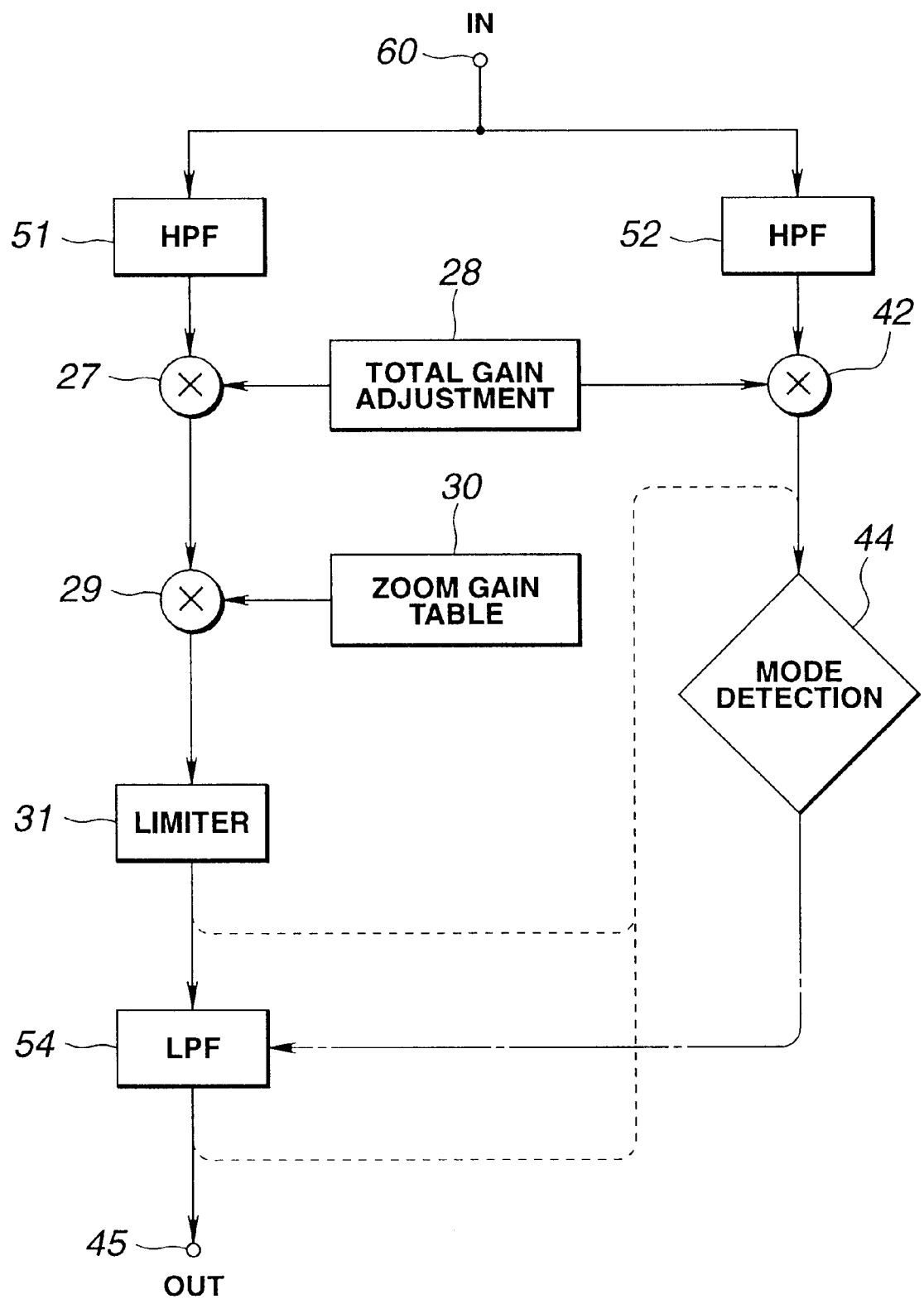
FIG. 24 is a block circuit diagram showing another embodiment of an arrangement for generating hand deviation correction signals provided in an image controlling circuit in which a smoothing filter and an attenuator are removed from the arrangement of FIG. 4 and the corresponding function is annexed to a low-pass filter.
Figure 25:
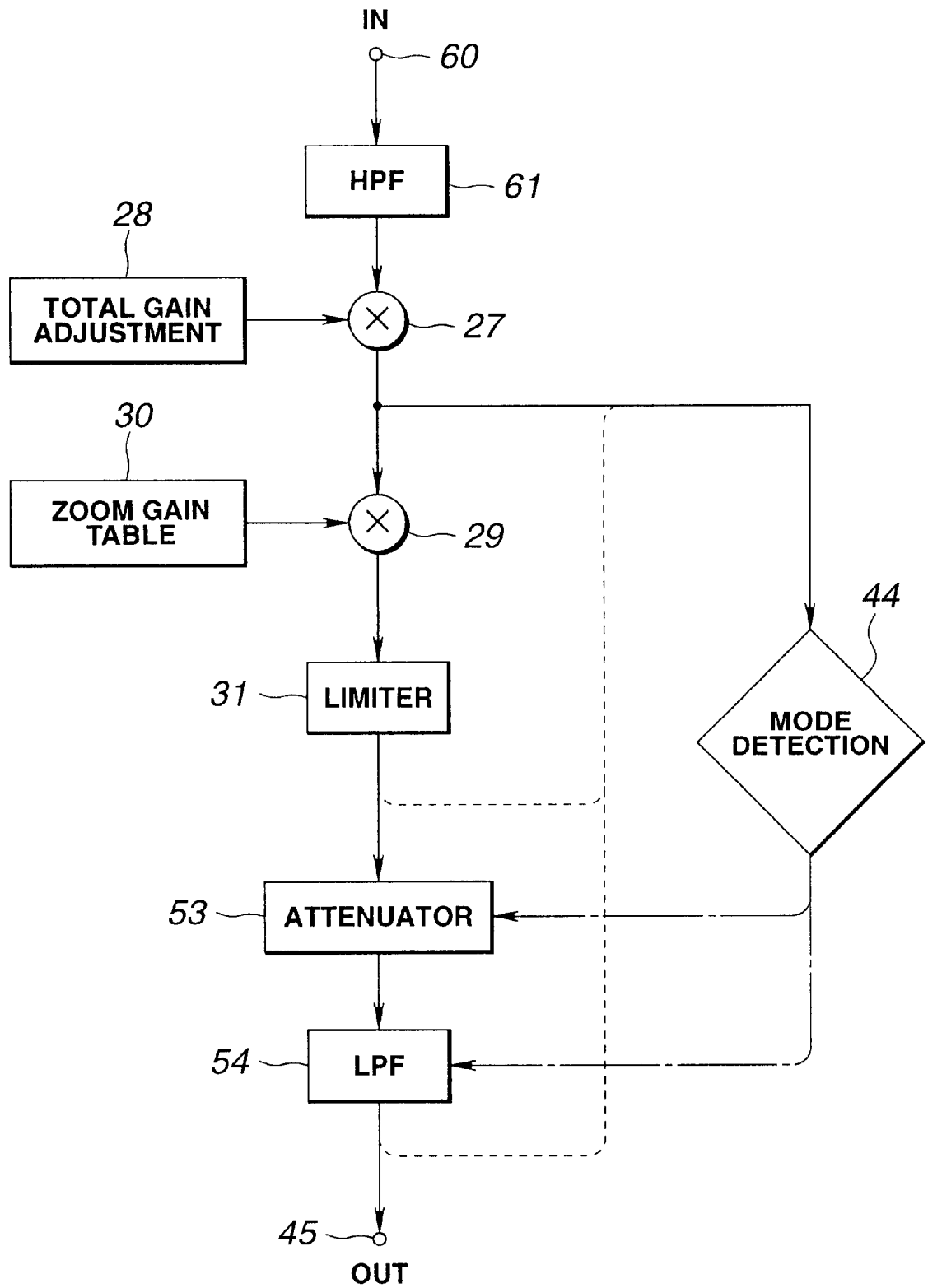
FIG. 25 is a block circuit diagram showing a further embodiment of an arrangement for generating hand deviation correction signals provided in an image controlling circuit in which a monitor unit and a high-pass filter of a processing unit in the arrangement of FIG. 4 are combined into one high-pass filter.
Figure 26:
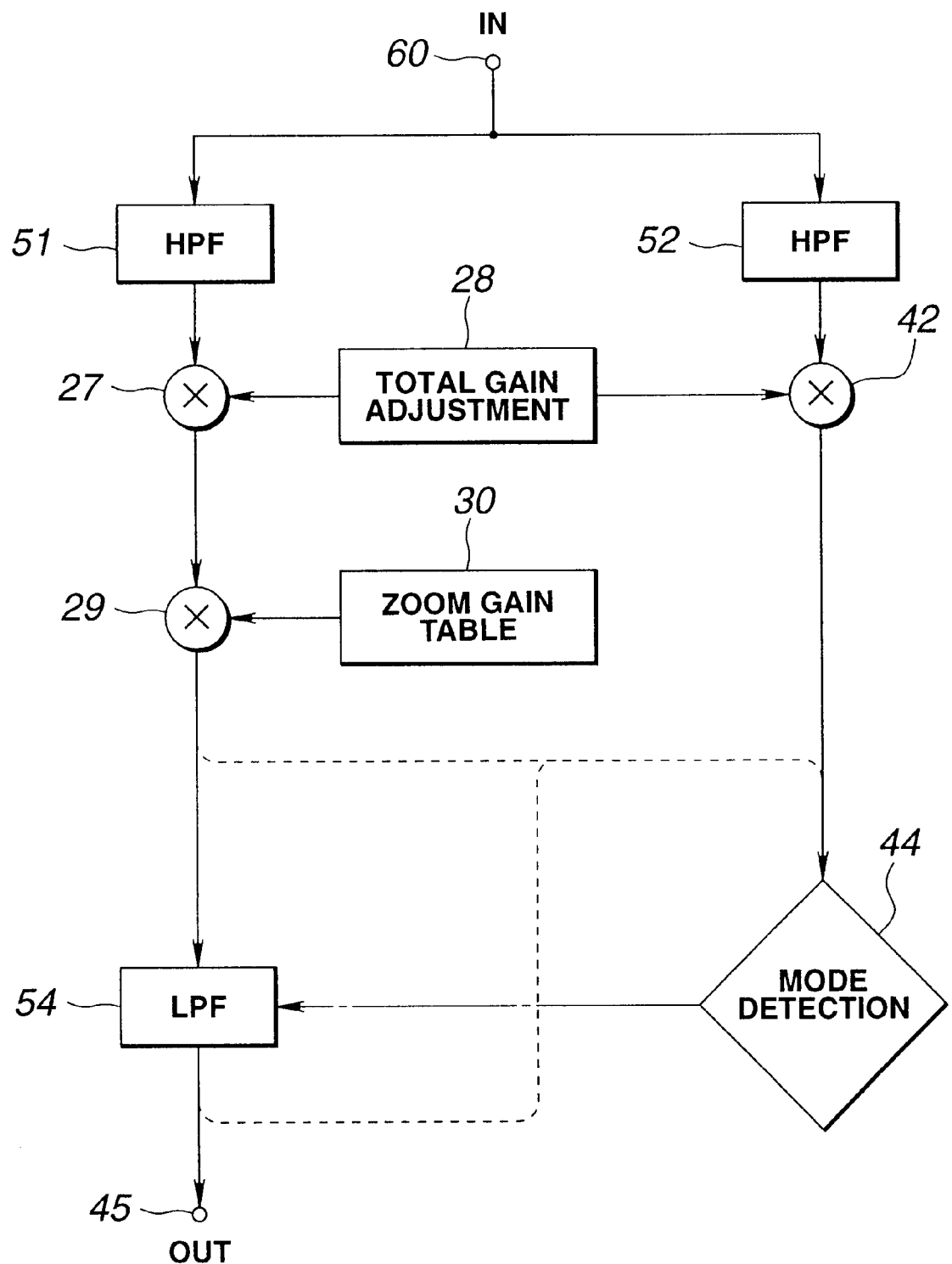
FIG. 26 is a block circuit diagram showing a further embodiment of an arrangement for generating hand deviation correction signals provided in an image controlling circuit in which a limiter and an attenuator in the arrangement of FIG. 4 are removed and the corresponding function is combined into a low-pass filter.
Figure 27:
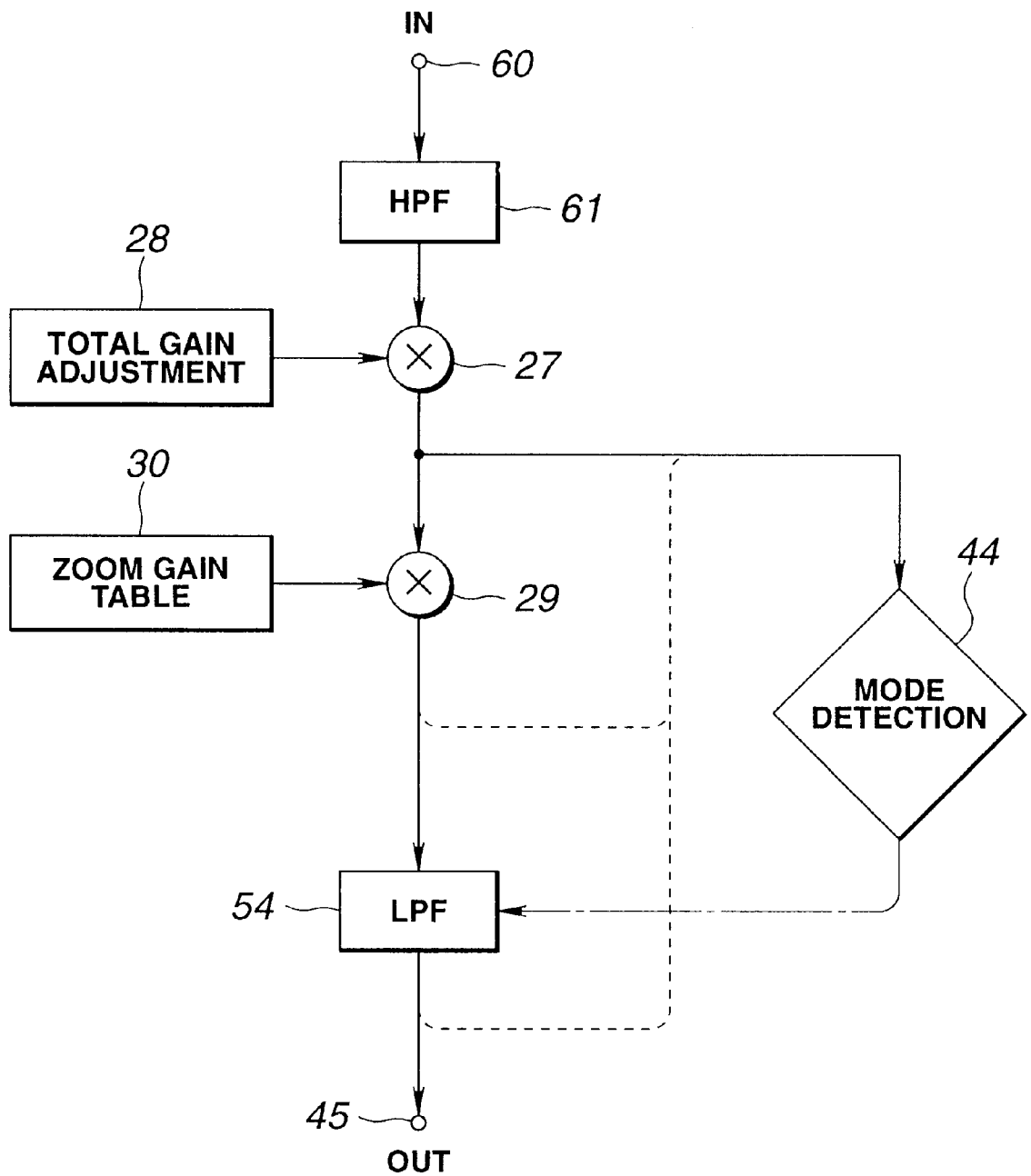
FIG. 27 is a block circuit diagram showing a further embodiment of an arrangement for generating hand deviation correction signals provided in an image controlling circuit in which a monitor unit and a high-pass filter of a processing unit in the arrangement of FIG. 26 are combined into one high-pass filter.
Figure 28:
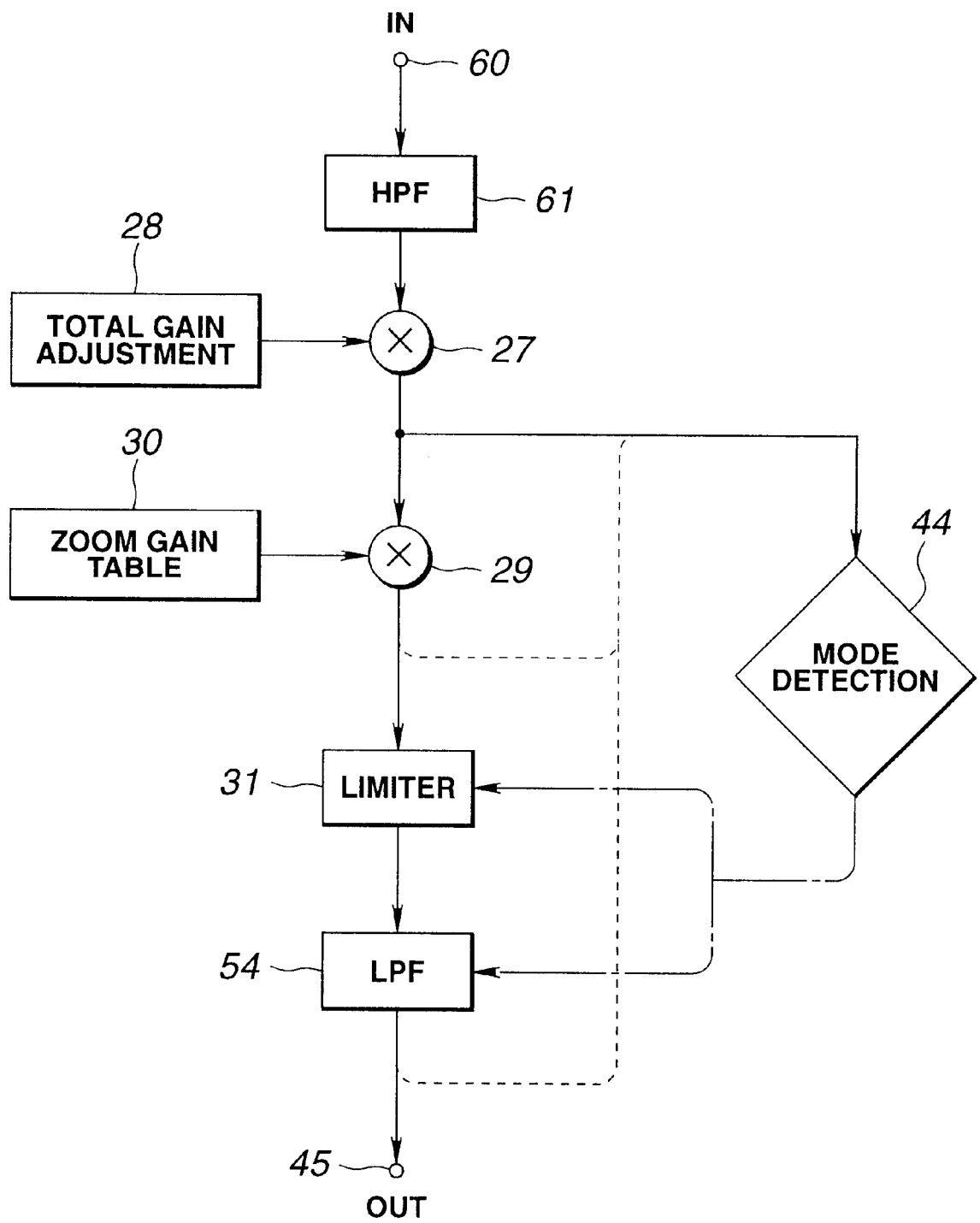
FIG. 28 is a block circuit diagram showing a further embodiment of an arrangement for generating hand deviation correction signals provided in an image controlling circuit in which an attenuator in the arrangement of FIG. 25 is removed and the corresponding function is added to a limiter.
Figure 29:
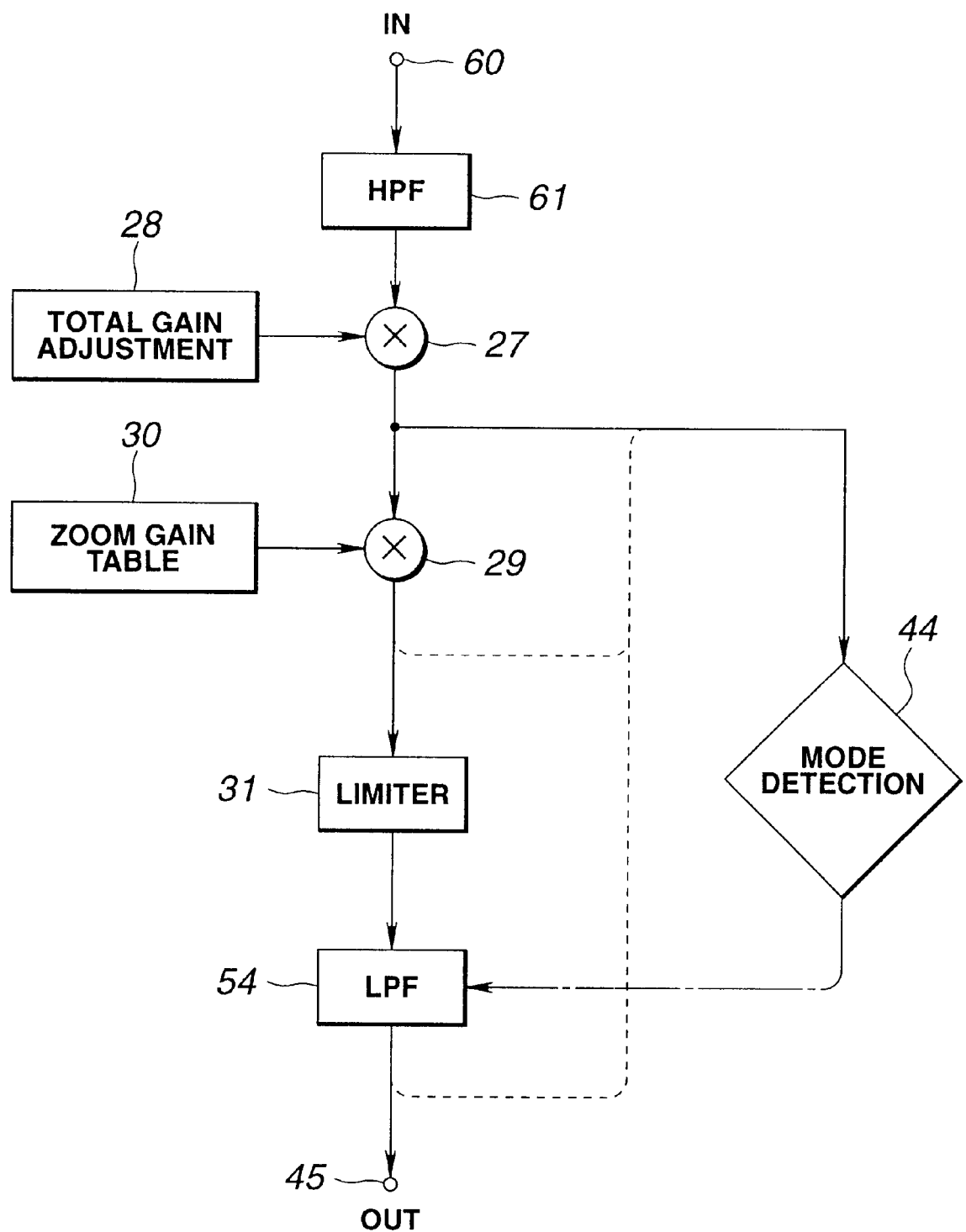
FIG. 29 is a block circuit diagram showing a further embodiment of an arrangement for generating hand deviation correction signals provided in an image controlling circuit in which an attenuator in the arrangement of FIG. 25 is removed and the corresponding function is added to a low-pass filter.

The arrangement provided in the image control circuit 8 of FIG. 3 for generating the hand deviation correction signal may be modified from that shown in FIG. 4 to those shown in FIGS. 24 to 29. In FIGS. 24 to 29, the parts or components similar to those of FIG. 4 are denoted by the same reference numerals. FIG. 24 shows an arrangement in which the smoothing filter 43 and the attenuator 53 are removed from the arrangement of FIG. 4 and the corresponding function is accorded to the low-pass filter 54. FIG. 25 shows an arrangement in which the monitor unit and the high-pass filter of the calculating unit in the arrangement of FIG. 4 are combined into one high-pass filter 61. FIG. 26 shows an arrangement in which the limiter and the attenuator are removed from the arrangement of FIG. 4 and the corresponding function is accorded to the low-pass filter 54. FIG. 27 shows an arrangement in which the monitor unit and the high-pass filter of the calculating unit in the arrangement of FIG. 26 are combined into one high-pass filter 61. FIG. 29 shows an arrangement in which the attenuator 53 is removed from the arrangement of FIG. 25 and the corresponding function is accorded to the low-pass filter 54.

In the present embodiment, as described above, the state of video camera deflection is classified into several modes, depending on data obtained from the angular velocity sensors 12, 13 or output data (integrated values) of the low-pass filter 54, and corresponding processing operations are combined for improving the comprehensive performance combined from the hand deviation correction performance and the panning/tilting follow-up performance. That is, with the hand deviation correction device and the video camera of the instant embodiment, the major portions of the panning/tilting components are deleted from data entering the low-pass filter. Since input data are of strongly periodic components, a sufficient linear correction area can be achieved, that is, a higher correction ability may be provided for the same CCD excess area. In addition, with the hand deviation correction device and the video camera of the present embodiment, since convergence processing is entered during panning/tilting, residual hand deviation is not liable to be produced, in other words, panning/tilting follow-up characteristics may be improved, as compared with the conventional hand deviation correction device. In addition, the hand deviation correction device and the video camera of the present embodiment render it possible to make effective use of excess pixels of the CCD image sensor.

Although a memory control system is used in the above-described embodiments for correcting hand deviation, it is also possible to use a method for correcting hand deviation by optical processing. Among known methods for correcting hand deviation by optical processing, there are a gimbal mechanical system and an active prism system. With the gimbal mechanical system, the lens unit in its entirety is moved by optical driving means on detection of hand deviation for canceling hand deviation for correcting for hand deviation. With this system, since the lens unit is moved in its entirety, the mechanism becomes increased in size to increase power consumption. This system, however, is suited for achieving high resolution since it is free from deterioration in resolution and has a wider correction range despite increased size. With the active prism system, a part of the lens unit is moved by optical driving means on detection of hand deviation in a direction of canceling hand deviation thereby correcting for hand deviation. This system is suited to a small-sized lightweight camera of high image quality since it is small in size, low in power consumption and free from deterioration in resolution while allowing for a wider correction range as compared to the gimbal mechanical system. If such system of correcting for hand deviation by optical processing is used, improved follow-up to deflection by panning or tilting and effective hand deviation correction may be achieved by making hand deviation mode decisions and making corrections responsive to the results of mode decisions.

Although the angular velocity detection system is employed in the above-described embodiments as a method for detecting hand deviation, a so-called motion vector detection system may also be employed. The motion vector detection system detects the amount and the direction of object movement by generating a difference of the object image signals of a current field and the previous field stored in a semiconductor memory by picture processing.

Figure 30:
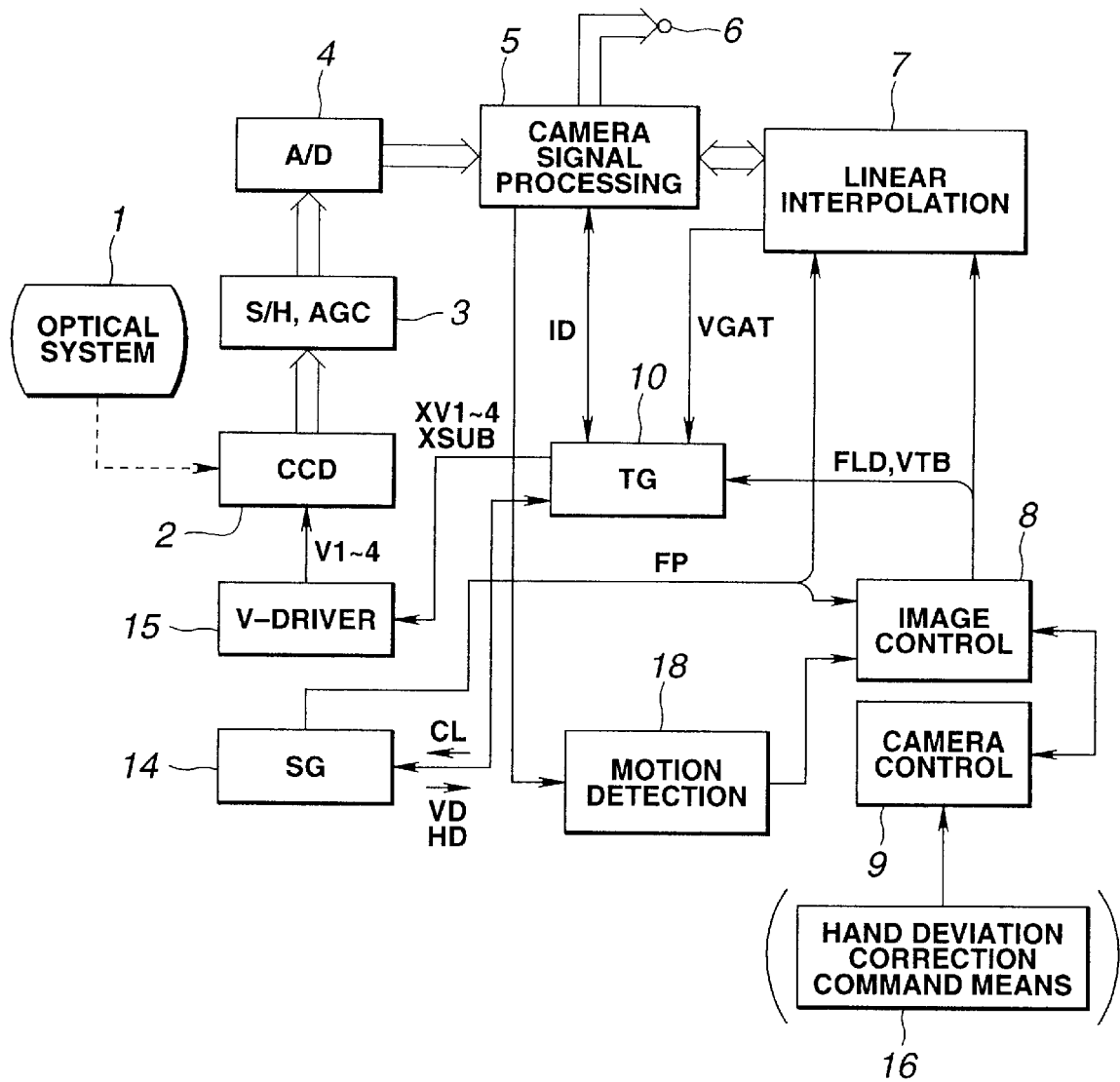
FIG. 30 is a schematic block circuit diagram showing a video. camera with a built-in hand deviation correction device employing a motion detection circuit as deviation detection means according to the present invention.

FIG. 30 shows an embodiment of the present invention for the motion vector detection system. In the present embodiment, a motion detection circuit 18 finds and outputs the maximum offset of frame or field correlatively of camera signals outputted by the camera signal processing circuit 5. As a motion vector detection method in the motion detection circuit 18, the motion vector detection method by a so-called typical point matching method, for example, may be employed. The typical point matching method finds values of correlation between typical points in a block of a current frame or field and pixels of points in a block corresponding to the firstly-stated block in the next frame or field and cumulatively adds the values to find a motion vector. Motion vector data thus detected by the motion detection circuit 18 is sent to the image control circuit 8. Since this system can be implemented only by ICs, the hand deviation correction device and hence the video camera can be reduced in size and cost.

I claim:

1. A deviation device comprising:

deflection detection means for receiving deflection detection signals and for detecting the state of deflection therefrom;

deflection state discriminating means for determining if the detected deflection state relates to a willful deflection or a deflection caused by hand deviation and, in accordance therewith, for forming a deflection state discriminating signal; and deflection correction signal outputting means for calculating a deflection correction amount from said deflection detection signals based on the deflection state discriminating signal from said deflection state discriminating means so as to obtain therefrom a deflection correction signal and for outputting the same, said deflection correction signal outputting means includes an attenuator having means for generating attenuation coefficients in response to said deflection state discriminating signal which attenuates a signal relating to said deflection detection signal by use of the attenuation coefficients and a filter having means for generating integration coefficients in accordance with the deflection state discriminating signal which integrates an attenuation signal from the attenuator by use of the integration coefficients.

2. The hand deviation correction device as claimed in claim 1 wherein said deflection correction signal outputting means reduces the deflection correction amount to zero if said deflection state discrimination signal indicates said willful deflection state, said deflection correction signal outputting means retaining a calculated value of the deflection correction amount if said deflection state discrimination signal indicates deflection by said hand deviation state.

3. The hand deviation correction device as claimed in claim 1 wherein said deflection detection means detects oscillations.

4. The hand deviation correction signal as claimed in claim 1 wherein said deflection detection means detects image movement from image signals.

5. A video camera comprising:

imaging means for generating electrical signals corresponding to light incident on an imaging surface thereof;

an optical system for forming an incident light image on said imaging surface of said imaging means;

image signal generating means for generating image signals from the electrical signals of said imaging means;

deflection detection means for receiving deflection detecting signals and for detecting the state of deflection therefrom;

deflection state discrimination means for determining if the detected deflection state relates to a willful deflection or a deflection caused by hand deviation and, in accordance therewith, for forming a deflection state discriminating signal;

deflection correction signal outputting means for calculating the amount of correction of deflection from said deflection detection signal based on the deflection state discrimination signal so as to obtain therefrom a deflection correction signal and for outputting the same, said deflection correction signal outputting means includes an attenuator having means for generating attenuation coefficients in response to said deflection state discriminating signal which attenuates a signal relating to said deflection detection signal by use of the attenuation coefficients and a filter having means for generating integration coefficients in accordance with the deflection state discriminating signal which integrates an attenuation signal from the attenuator by use of the integration coefficients; and correction means for correcting the deflection responsive to said deflection correction signal.

6. The video camera as claimed in claim 5 wherein said deflection correction signal outputting means reduces the deflection correction amount to zero if said deflection state discrimination signal indicates said willful deflection state, said deflection correction signal outputting means retaining a calculated value of the deflection correction amount if said deflection state discrimination signal indicates deflection by said hand deviation state.

7. The video camera as claimed in claim 5 wherein said deflection correction means takes out part of the image signals as an image signal and moves an image field of the previous field and an image field of the current field into register with each other depending on the amount of correction of deflection, said deflection correction means correcting the deflection by said two image frames coinciding with each other.

8. The video camera as claimed in claim 5 wherein said deflection correction means has driving means for driving said optical system for shifting the position of an incident light image formed on an imaging surface of said imaging means, said deflection correction means shifting the position of the incident light image formed on the imaging surface of said imaging means depending on the amount of correction of deflection for correcting the deflection.

9. The video camera as claimed in claim 5 wherein said deflection detection means detects oscillations.

10. The video camera as claimed in claim 5 wherein said deflection detection means detects image movement from image signals.

11. The hand deviation correction device as claimed in claim 1 wherein the integration coefficients used during a willful deflection state are not the same as those used during a hand deviation deflection state.

12. The video camera as claimed in claim 5 wherein the integration coefficients used during a willful deflection state are not the same as those used during a hand deviation deflection state.

* * * * *